US012661634B2

(12) United States Patent
John et al.

(10) Patent No.: US 12,661,634 B2
(45) Date of Patent: Jun. 23, 2026

(54) NANOTUBES IN POROUS PARTICLES

(71) Applicants: The Administrators of the Tulane Educational Fund, New Orleans, LA (US); UNIVERSITY OF CONNECTICUT, Farmington, CT (US)

(72) Inventors: Vijay T. John, Destrehan, LA (US); Ioulia A. Valla, Storrs, CT (US)

(73) Assignees: The Administrators of the Tulane Educational Fund, New Orleans, LA (US); UNIVERSITY OF CONNECTICUT, Farmington, CT (US)

( * ) Notice: Subject to any disclaimer, the term of this patent is extended or adjusted under 35 U.S.C. 154(b) by 998 days.

(21) Appl. No.: 17/614,955

(22) PCT Filed: May 29, 2020

(86) PCT No.: PCT/US2020/035304
§ 371 (c)(1),
(2) Date: Nov. 29, 2021

(87) PCT Pub. No.: WO2020/243558
PCT Pub. Date: Dec. 3, 2020

(65) Prior Publication Data
US 2022/0219138 A1 Jul. 14, 2022

Related U.S. Application Data

(60) Provisional application No. 62/854,691, filed on May 30, 2019.

(51) Int. Cl.
| | |
|---|---|
| *B01J 20/26* | (2006.01) |
| *B01D 53/86* | (2006.01) |
| *B01J 20/18* | (2006.01) |
| *B01J 20/28* | (2006.01) |
| *B01J 20/30* | (2006.01) |
| *B01J 21/12* | (2006.01) |
| *B01J 29/70* | (2006.01) |
| *B01J 35/45* | (2024.01) |
| *B01J 37/00* | (2006.01) |
| *C05G 5/27* | (2020.01) |
| *C05G 5/40* | (2020.01) |

(52) U.S. Cl.
CPC ........ *B01J 20/262* (2013.01); *B01D 53/8671* (2013.01); *B01J 20/183* (2013.01); *B01J 20/28016* (2013.01); *B01J 20/3028* (2013.01); *B01J 20/3042* (2013.01); *B01J 20/3085* (2013.01); *B01J 21/12* (2013.01); *B01J 29/70* (2013.01); *B01J 37/0018* (2013.01); *B01J 37/0072* (2013.01); *C05G 5/27* (2020.02); *C05G 5/40* (2020.02); *B01D 2255/50* (2013.01); *B01D 2257/504* (2013.01); *B01J*
*35/45* (2024.01); *B01J 2235/15* (2024.01); *B01J 2235/30* (2024.01)

(58) Field of Classification Search
None
See application file for complete search history.

(56) References Cited

U.S. PATENT DOCUMENTS

| | | |
|---|---|---|
| 7,332,636 B2 | 2/2008 | Xu et al. |
| 7,357,983 B2 | 4/2008 | Pfefferle et al. |
| 8,388,984 B2 | 3/2013 | Huguet et al. |
| 8,716,163 B2 | 5/2014 | Liu et al. |
| 9,675,967 B2 | 6/2017 | Stockwell et al. |
| 2003/0170295 A1 | 9/2003 | Kim et al. |
| 2006/0116284 A1 | 6/2006 | Pak et al. |
| 2012/0028798 A1 | 2/2012 | Worsley et al. |
| 2012/0258850 A1 | 10/2012 | Kuo et al. |
| 2013/0302611 A1 | 11/2013 | Joo et al. |

FOREIGN PATENT DOCUMENTS

| | | |
|---|---|---|
| CN | 1239203 C | 2/2006 |
| CN | 101134172 B | 10/2010 |
| CN | 102527329 A | 7/2012 |
| CN | 104226274 A | 12/2014 |

OTHER PUBLICATIONS

Y Lvov, A Panchal, Y Fu, R Fakhrullin, M Kryuchkova, S Batasheva, A Stavitskaya, A Glotov, V Vinokurov, Interfacial Self-Assembly in Halloysite Nanotube Composites, Langmuir 2019 35 (26), 8646-8657, DOI: 10.1021/acs.langmuir.8b04313 (Year: 2019).*

X Xu, C Song, J Andresen, B Miller, A Scaroni, Novel Polyethylenimine-Modified Mesoporous Molecular Sieve of MCM-41 Type as High-Capacity Adsorbent for CO2 Capture, Energy & Fuels 2002 16 (6), 1463-1469, DOI: 10.1021/ef020058u (Year: 2002).*

J Zhou, H Zhao, J Li, Y Zhu, J Hu, H Liu, Y Hu, CO2 capture on micro/mesoporous composites of (zeolite A)/(MCM-41) with Ca2+ located: Computer simulation and experimental studies, Solid State Sciences, vol. 24, 2013, pp. 107-114, doi.org/10.1016/j.solidstatesciences.2013.07.008. (Year: 2013).*

P Zhao, L Cao, D Ma, Z Zhou, Q Huang, C Pan, Translocation, distribution and degradation of prochloraz-loaded mesoporous silica nanoparticles in cucumber plants, Nanoscale, (2018), 10, 1798-1806, DOI: 10.1039/C7NR08107C (Year: 2018).*

K.S.N. Kamarudin, N. Alias, Adsorption performance of MCM-41 impregnated with amine for CO2 removal, Fuel Processing Technology, vol. 106, (2013), 332-337, doi.org/10.1016/j.fuproc.2012.08.017 (Year: 2013).*

(Continued)

*Primary Examiner* — Katherine Peebles
*Assistant Examiner* — Afua Bamfoaa Boateng
(74) *Attorney, Agent, or Firm* — Bell & Manning, LLC

(57) ABSTRACT

Disclosed herein are compositions and methods that allow access to the interior of porous particles by inserting nanotubes into the particles. The compositions and methods disclosed herein are useful in several applications such as in catalytic reactions, plant active delivery, pharmaceutical drug delivery, and in absorbing environmental contaminants.

22 Claims, 12 Drawing Sheets

(56)          References Cited

OTHER PUBLICATIONS

Lu, Y., Liu, X., Wang, W. et al. Hierarchical, porous CuS microspheres integrated with carbon nanotubes for high-performance supercapacitors. Sci Rep 5, 16584 (2015). https://doi.org/10.1038/srep16584 (Year: 2015).*

Björk, Synthesizing and characterizing mesoporous silica SBA-15: A hands-on laboratory experiment for undergraduates using various instrumental techniques, J. Chem. Educ., 94:91-94 (2017).

Glotov et al, Templated self-assembly of ordered mesoporous silica on clay nanotubes, Chem. Commun., 55:5507-5510 (2019).

Glotov et al., A study of platinum catalysts based on ordered Al-MCM-41 aluminosilicate and natural halloysite nanotubes in xylene isomerization, Petroleum Chem., 59(11):1226-34 (2019).

International Application No. PCT/US20/35304, International Search Report and Written Opinion, mailed Oct. 19, 2020.

Jia et al., Aerosol-Assisted Heteroassembly of Oxide Nanocrystals and Carbon Nanotubes into 3D Mesoporous Composites for High-Rate Electrochemical Energy Storage, Small, 11(26):3135-42 (2015).

Massaro et al., Halloysite nanotubes as support for metal-based catalysts, J. Mater. Chem. A, 5:13276-93 (2017).

Su et al., A Bottle-around-a-Ship Method to Generate Hollow Thin-Shelled Particles Containing Encapsulated Iron Species with Application to the Environmental Decontamination of Chlorinated Compounds, ACS Appl. Mater. Interfaces, 10:13542-13551 (2018).

Tae et al., Catalytic degradation of polystyrene using acid-treated halloysite clays, Solid State Ionics, 172:129-33 (2004).

Xie et al., Mesoporous material AI-MCM-41 from natural halloysite, Physics and Chemistry of Minerals, 41(7):497-503 (2014).

Zatta et al., Raw halloysite as reusable heterogeneous catalyst for esterification of lauric acid, Appl. Clay Sci., 51(1):165-9 (2011).

Lu et al., Aerosol-assisted self-assembly of mesostructured spherical nanoparticles, Nature, 398:223-6 (1999).

European Patent Application No. 201815364.3, Partial Supplementary European Search Report, dated May 4, 2023.

Lee et al., Silica-coated multi-walled carbon nanotubes impregnated with polyethyleneimine for carbon dioxide capture under the flue gas condition, J Solid State Chem., 226:17-23 (2015).

Lvov et al., Functional polymer-clay nanotube composites with sustained release of chemical ag, Prog. Polymer Sci., 38(10):1690-719 (2013).

Shen et al., Polyethylenimine applications in carbon dioxide capture and separation: from theoretical study to experimental work, Energy Tec., 5(6):822-33 (2017).

Nam et al., Drug delivery nanosystems for the localized treatment of glioblastoma multiforme, Materials, 11:779 (2018).

Beck et al., A new family of mesoporous molecular sieves prepared with liquid crystal templates, J. Am. Chem. Soc., 114(27):10834-43 (1992).

* cited by examiner

S4800 3.0kV 12.6mm x20.0k SE(M) 9/24/2019 13:26     2.00um 50 nm

NANOTUBES IN POROUS PARTICLES

STATEMENT REGARDING FEDERALLY SPONSORED RESEARCH

This invention was made with government support under award number 1826146 awarded by the National Science Foundation, Division of Civil, Mechanical, & Manufacturing Innovation and award number 1826213 awarded by the National Science Foundation, Division of Civil, Mechanical, & Manufacturing Innovation. The government has certain rights in the invention.

FIELD OF THE INVENTION

The present disclosure describes the use of nanotubes inserted into highly porous particles to increase access to the interiors of said particles, resulting in applications including, but not limited to, the following: improved catalyst design in chemical synthesis and petroleum processing, application as delivery vehicles for agricultural actives and pharmaceutical drugs, and use capturing and converting environmental contaminants.

BACKGROUND

Heterogeneous catalysis is the backbone of the chemical industry where pellets containing active catalytic materials embedded throughout a porous support matrix serve to catalyze reaction processes. The support matrix typically is a ceramic component ($SiO_2$ or variants with $Al_2O_3$), and the active catalytic materials are usually clusters of precious metals or zeolite microcrystals. The catalyst pellet consisting of the support matrix and the active materials are manufactured in spherical or cylindrical morphologies, and these pellets are then used in packed bed reactors. Effective access to the interior of said catalyst pellets, one of the most fundamental concepts in classical chemical engineering that has been prevalent for over half a century with no evident solution, remains a challenge. In catalytic systems, there is an interplay between intrinsic reaction kinetics and diffusion that is a fundamental aspect of catalyst pellet design and a foundational principle of chemical reaction engineering. When diffusion restrictions limit access to the interior of the pellet, reaction effectiveness is significantly decreased leading to a waste of catalytic sites. These concepts are well described through the classical concepts of the Thiele Modulus and the pellet Effectiveness Factor, for example, in H. Scott Fogler, *Elements of Chemical Reaction Engineering* (6th Ed. 2020), which is incorporated herein by reference.

Access to the interior of the pellet has thus been a focus of catalytic studies but proposed methods have increased interior access at the expense of negatively altering reaction conditions. Decreasing the size of the catalytic support to decrease diffusional restrictions, for instance, results in a pressure drop in the catalytic reactor, an undesirable outcome. Combining supports with different pore sizes generates a better effectiveness factor, but the practical use of said mixed composition within a reactor is not always feasible. To optimize pore shape and size within the support, the creating distribution channels, such as via etching, in premade catalytic pellets has been proposed, yet this is also technically infeasible and leads to a loss of structural stability. As such, a structure that provides the integrity and strength of the support's natural geometry as well as a mechanism for accessing the interior is desirable.

Recently, researchers have been able to template MCM-41 on halloysite nanotubes (HNT) shown to withstand immense pressures, yet the benefit of this unique feature is confined to only select catalytic reactions, as most do not require such high pressures. See Glotov et al, "Templated self-assembly of ordered mesoporous silica on clay nanotubes", *Chem. Commun.*, 2019, 55, 5507-5510. The design of Glotov et al builds MCM-41 around HNTs and in the lumen of the HNT. Glotov et al prepares the MCM-41/HNT composite by dispersing the HNT in a mixture of cetyltrimethylammonium bromide and isopropyl alcohol, followed by the addition of tetraethoxysilane to provide a gel that is then heated, filtered, dried, and calcined to form a composite structure. The function of the HNT in this material is as a structural support for the MCM-41, and the composite does not demonstrate an improvement in diffusional limitations. Indeed, the concept of diffusion and reaction are not discussed in the paper. Building MCM-41 around HNTs does not allow for incorporation of additional materials in the composite matrix. Furthermore, zeolite could not be used as a catalyst because it would precipitate out of the design of Glotov et al.

Others have produced core-shell zeolite-based catalysts, wherein halloysite is used as a binder for the shell. See U.S. Pat. No. 9,675,967 (the '967 patent). However, the '967 does not disclose compositions or methods of making same that have a uniform composite matrix of zeolite and support with embedded halloysite to aid in transport of reactants to the zeolites embedded through the support.

SUMMARY

The present disclosure describes nanotubes inserted into highly porous particles. The nanotubes penetrate each particle at various points to allow reactants to access the entire interior of the particle. While halloysite nanotubes have been used as catalytic supports themselves, as their hollow interior provides much surface area, their ability to transport materials that otherwise could not access the interiors of the support's porous particles into which they are inserted has not been explored or developed. Similarly, while nanotubes have been recognized for their structural capacity to transport materials between a barrier, they have not been employed to solve the diffusion limitation problem of catalysis in such a way. The present disclosure describes a novel way of accessing the interior of porous particles with the insertion of nanotubes through the surfaces of said porous particles. This structure is useful in several applications such as in catalytic reactions, plant active delivery, pharmaceutical drug delivery, and in absorbing environmental contaminants. In embodiments, the porous particles, which function as the catalytic support, are MCM-41 mesoporous particles, and the nanotubes are halloysite nanotubes. Halloysite nanotubes (HNTs), which are hollow clay tubes, serve as reinforced tunnels through which reactants may access and products may efficiently leave the interior of the MCM-41 particle. In this way, the natural structure and strength of the mesoporous material is maintained while access to the interior is granted.

The MCM-41 and halloysite composition in some embodiments is synthesized via an aerosolization process wherein the halloysite material is introduced into the MCM-41 particles in a single, simple step. Compared to other methods that decrease the diffusion limitations or require the synthesis of, for instance, more complex hollow or core-shell structures, the disclosed aerosolization represents a much easier and efficient process. While the aerosolization process is a well-known method of preparation for silica particles, the disclosed process where, within the process, the halloysite nanotubes are introduced such that they effectively and efficiently insert themselves into the porous particles is not obvious. The general aerosolization process employed is further described in Su et al., "A Bottle-around-a-Ship Method to Generate Hollow Thin-Shelled Particles Containing Encapsulated Iron Species with Application to the Environmental Decontamination of Chlorinated Compounds", *ACS Appl. Mater. Interfaces* 2018, 10, 13542-13551, which is hereby incorporated by reference in its entirety. The preparation of MCM-41 through the aerosolization method disclosed herein allows incorporation of a variety of materials in the matrix.

It is an object of the disclosure to decrease catalytic waste in chemical synthesis and petrochemical engineering by enabling the efficient entry of reactants to the catalytic interiors of the highly porous particles via the inserted nanotubes.

It is an additional object of this disclosure to enable the transport of plant actives and pharmaceutical drugs via the inserted nanotubes from the highly porous particle interior to the desired deposit sites.

It is an additional object of this disclosure to enable the attachment of ligands used for the adsorption of environmental contaminants by using the nanotube lumen as a scaffold through which said ligands may be inserted into the pores of the highly porous particle material.

In one aspect, the disclosure provides a composition of matter comprising porous particles and a nanotube penetrating the porous particle, wherein (a) the lumen of the nanotube is substantially free of the porous particle; and/or (b) the composition of matter further comprises a plant active, a pharmaceutical drug, a ligand, a polymer, an aminated compound, or a combination thereof embedded in the porous particle.

Another aspect of the disclosure provides a method of synthesizing a composition of matter comprising aerosolizing into droplets a precursor solution comprising a templating surfactant, a silica precursor, a solvent, and nanotubes; and heating the droplets to make particles.

Another aspect of the disclosure provides a method for optimizing a catalytic reaction comprising contacting one or more hydrocarbon reagents with the composition of matter of the disclosure.

Another aspect of the disclosure provides a method for preparing a composition of matter of the disclosure having a plant active embedded in the porous particle, the method comprising incubating the composition of matter of the disclosure in a solution comprising the plant active and a solvent, and evaporating the solvent to yield the composition of matter having the plant active embedded in the porous particle.

Another aspect of the disclosure provides a method for delivering a plant active to a plant, comprising spraying the plant with a combination of the composition of matter of the disclosure having a plant active embedded therein and a carrier.

Another aspect of the disclosure provides a method for preparing a composition of matter of the disclosure having a pharmaceutical drug embedded in the porous particle, the method comprising incubating the composition of matter of the disclosure in a solution comprising the pharmaceutical drug and a solvent, and evaporating the solvent to yield the composition of matter having the pharmaceutical drug embedded in the porous particle.

Another aspect of the disclosure provides a method for delivering a pharmaceutical drug to a human or animal comprising administering a composition comprising the composition of matter having the pharmaceutical drug embedded in the porous particle and a pharmaceutical carrier to a human or animal.

Another aspect of the disclosure provides a method for preparing a composition of matter having a ligand embedded in the porous particle, the method comprising contacting a composition of matter of the disclosure with the ligand.

Another aspect of the disclosure provides a method of absorbing on a composition of matter of the disclosure having a ligand embedded in the porous particle, comprising placing the composition of matter of the disclosure having a ligand embedded in the porous particle with the environmental contaminants.

Another aspect of the disclosure provides a method of preparing a composition of matter of the disclosure having a polymer embedded in the porous particle, the method comprising incubating a composition of matter of the disclosure in a solution comprising polymers and a solvent and evaporating the solvent to yield polymers embedded in the interior of the porous particle.

Another aspect of the disclosure provides a method of capturing carbon dioxide in the composition of matter of the disclosure having a polymer embedded in the porous particle, comprising contacting the composition of matter of the disclosure having a polymer embedded in the porous particle with carbon dioxide.

Another aspect of the disclosure provides a method of converting calcium oxide (CaO) into calcium carbonate $(CaCO_3)$ comprising contacting the composition of matter of the disclosure wherein the porous particle comprises calcium oxide with carbon dioxide.

Other objects, aspects, and advantages of this disclosure will become readily apparent from the ensuing description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the description of the specific embodiments presented herein.

On the bottom, the pellet with nanostraws introduced allows a constant reactant concentration throughout said pellet, exemplified by the constant concentration profile across the interior and external surface of said pellet, $$C_A = C_A^S.$$

Figure 2:
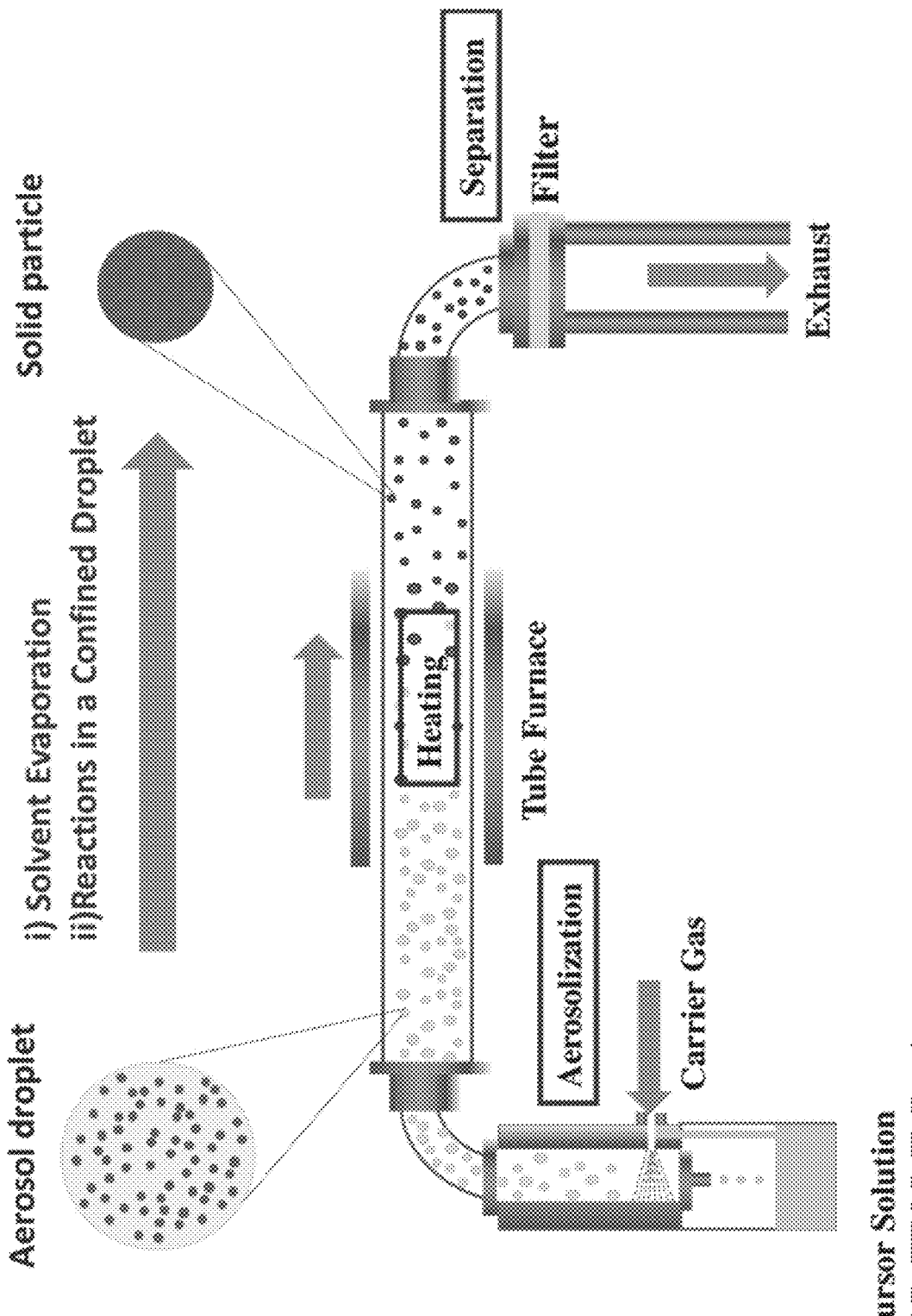

FIG. 2 shows a schematic of the aerosol process for synthesizing a porous catalyst support, MCM-41, and for introducing HNTs into the porous particles of said catalyst support. The precursor solution consists of the templating surfactant, cetyltrimethylammoniumbromide (CTAB); the silica precursor, tetraethyl orthosilicase (TEOS); halloysite nanostraws; and the solvent, ethanol/water (80/20 by volume). The precursor solution is passed through an aerosol assisted route and then a heated zone. In the heated zone, the solvent evaporates, TEOS condenses to silica, and CTAB templates the material to the solid and ordered MCM-41. Because the reactions occur in a confined environment of a droplet, intimate mixing of all constituents results, with the halloysite thus forced into the MCM-41 particles.

Figure 3:
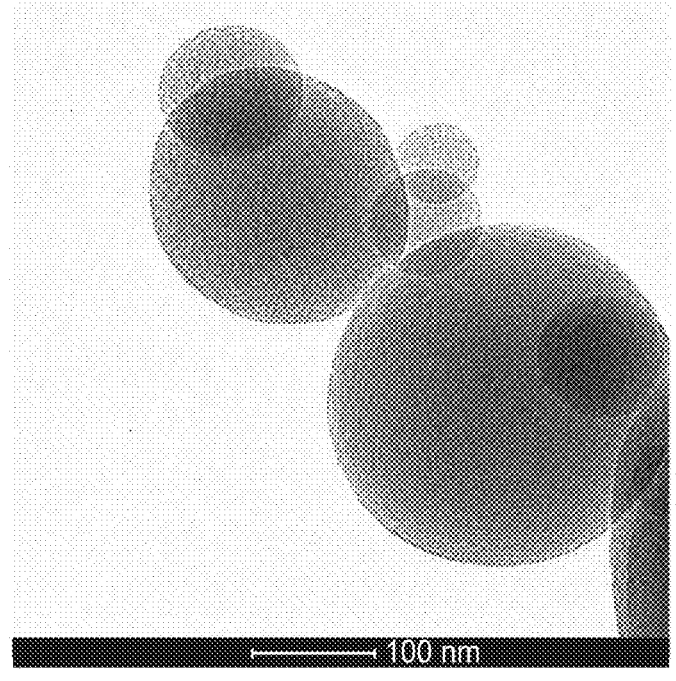

FIG. 3 shows the MCM-41 mesoporous silicas formed through the aerosol route. The inherent polydispersity in particle size is an inherent feature of the aerosol process which can be somewhat controlled by the nozzle size but does not represent a disadvantage to the present disclosure.

Figure 4:
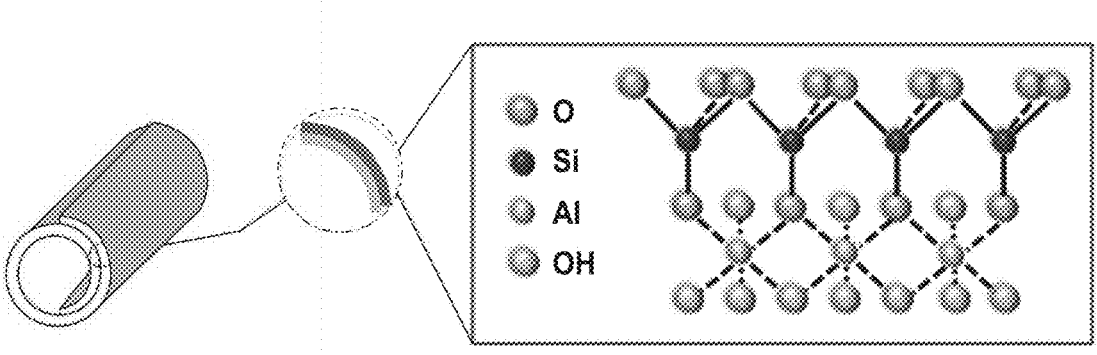

FIG. 4 shows the structural characteristics of halloysite nanotubes. The external surface consists of siloxane (Si—O—Si) groups, and the internal surface consists of aluminol (Al—OH) groups. The structural isomorphic substitution of Si for Al leads to the unequal charge distribution between the cationic Al-rich inner surface and the anionic Si-rich outer surface.

Figure 5:
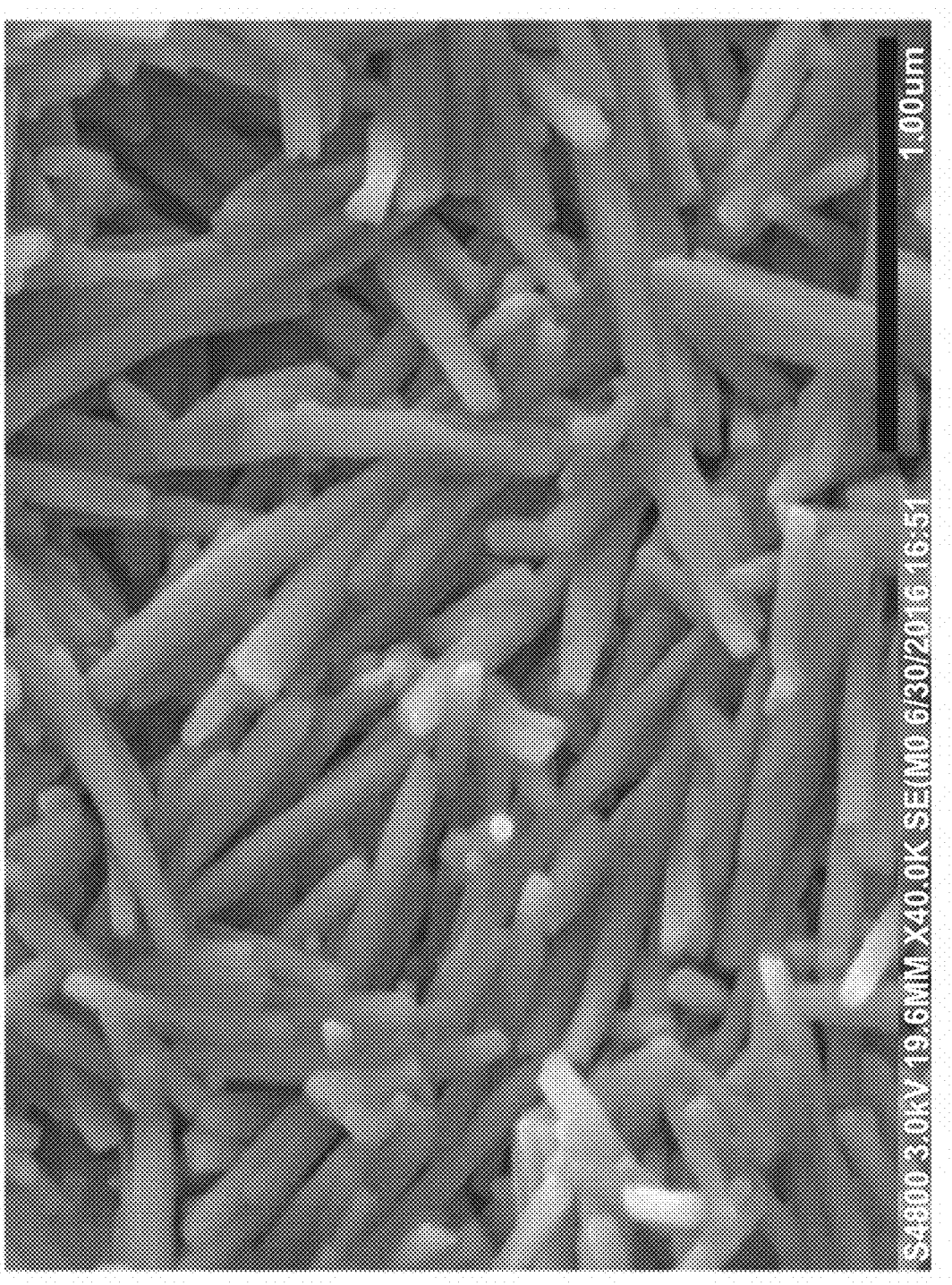

FIG. 5 shows a scanning electron microscope (SEM) image of halloysite nanotubes as they naturally occur as small scroll-like clay sheets, a consequence of a lattice mismatch between the two different layers comprising the clay sheet of halloysite.

Figure 6:
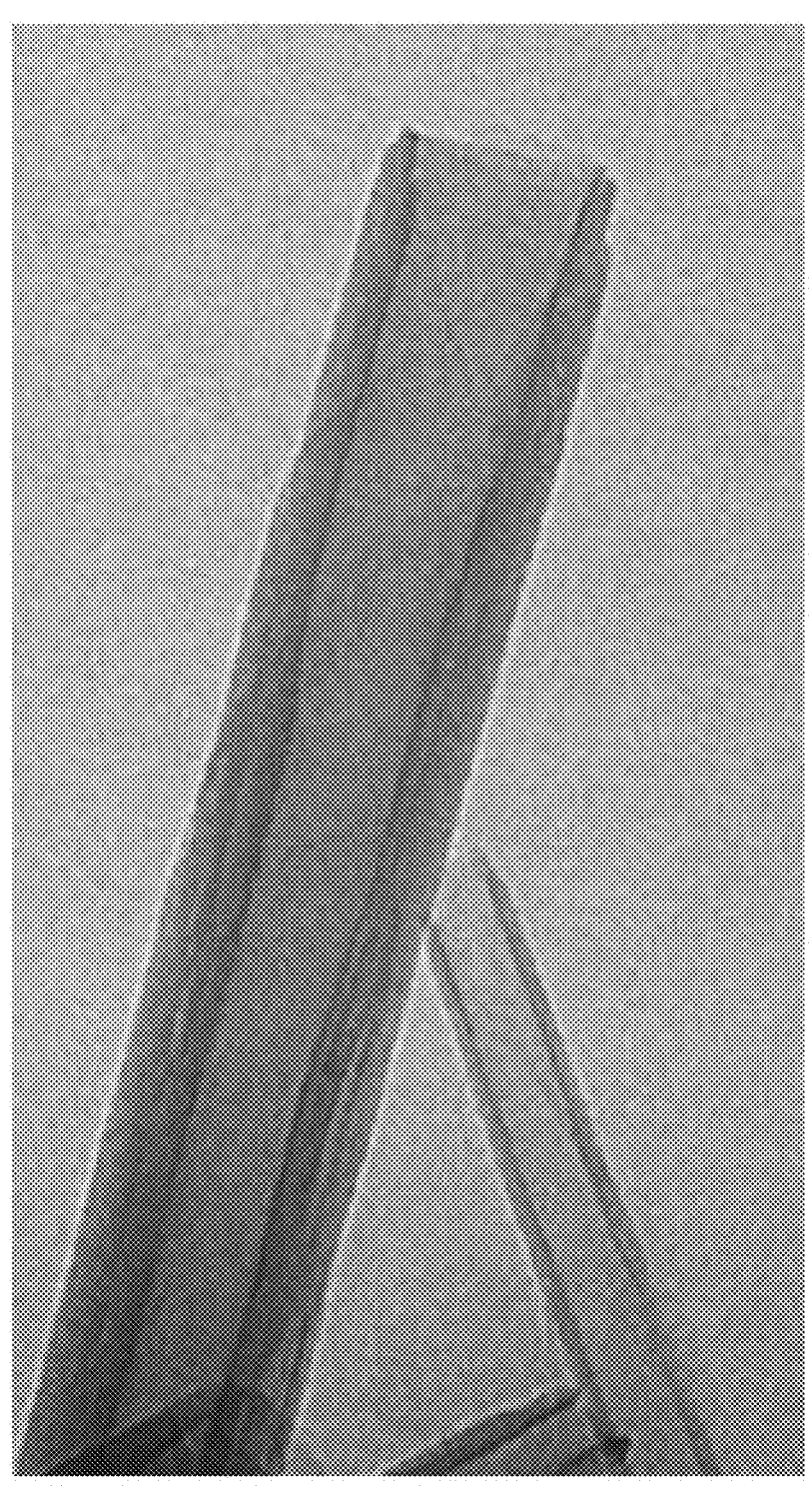

FIG. 6 shows a transmission electron microscope (TEM) image of halloysite, revealing its morphology and internal structure. The outer diameter of the halloysite is 60-100 nm, while the inner lumen can range from 2 nm to 60 nm.

Figure 7:
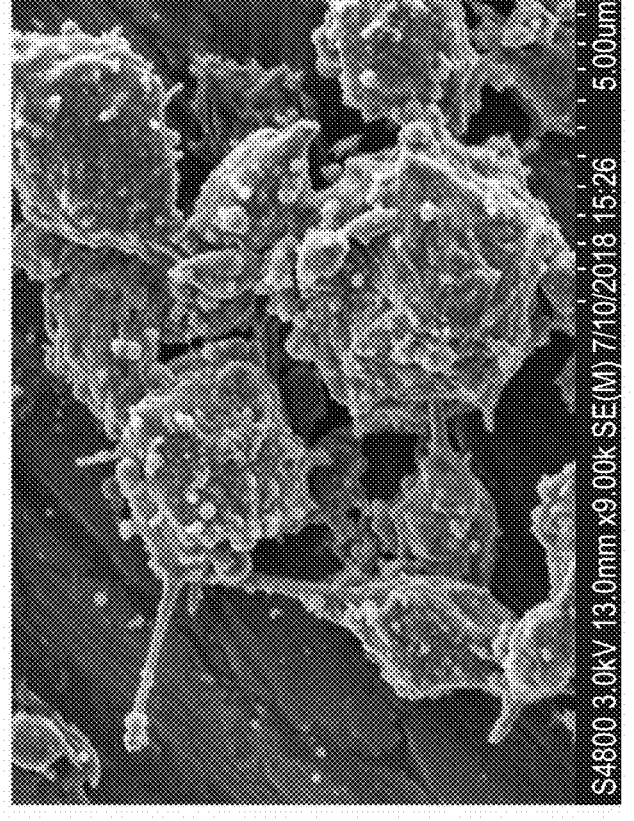
Figure 7:

FIG. 7 shows SEM images of halloysite nanotubes sticking into MCM-41 particles. On the top is a system with a relatively lower concentration of halloysite nanotubes. On the bottom is a system with a high concentration of halloysite nanotubes. The high concentration distorts the smoothness of the particle surface with several tubes seen lying somewhat parallel to the particle curvature.

Figure 8:
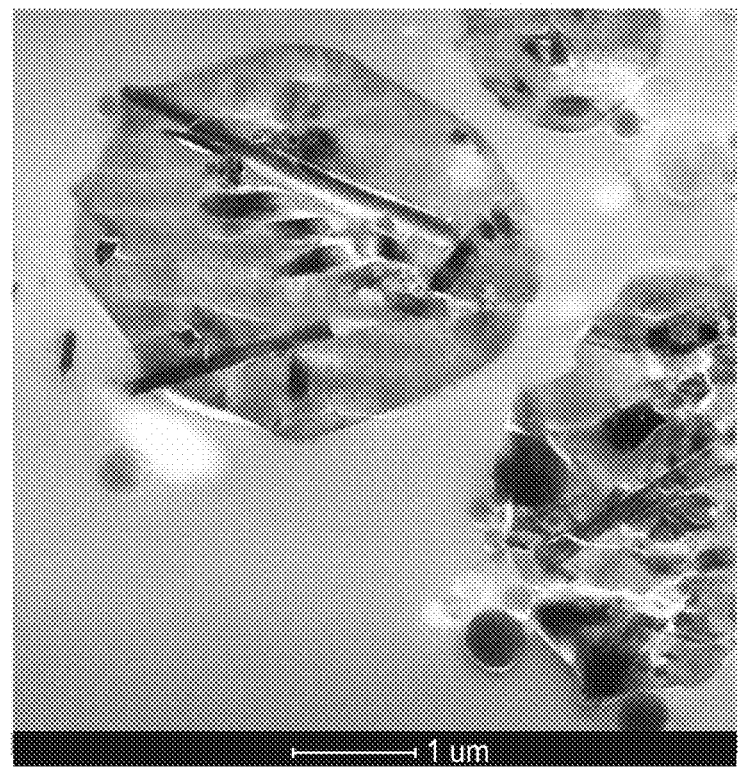

FIG. 8 shows a cut section TEM image of halloysite nanotube penetration into MCM-41 particles.

Figure 9:
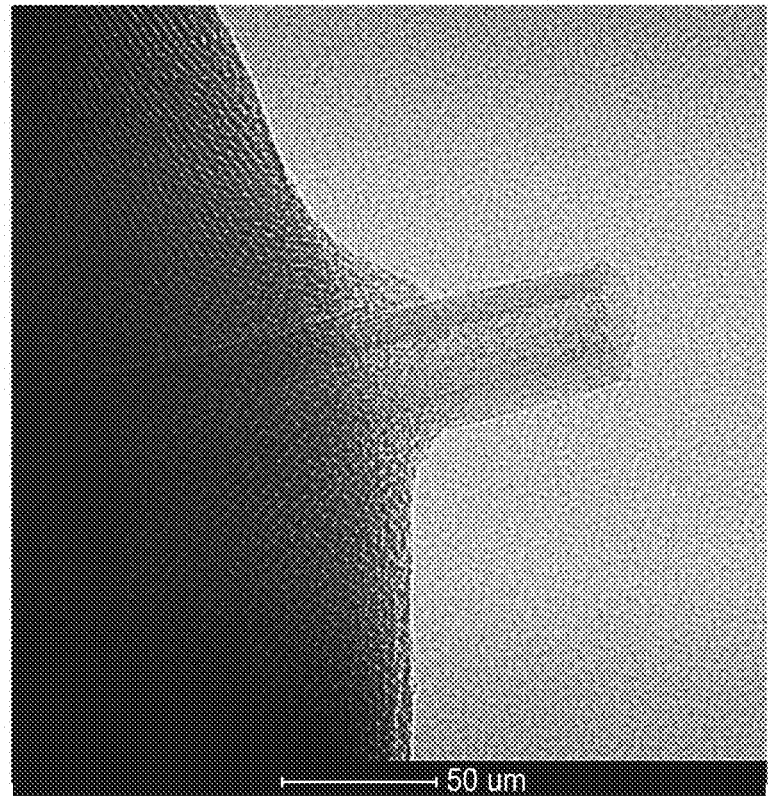

FIG. 9 shows a direct high resolution TEM image depicting the tip of a halloysite nanotube protruding from a MCM-41 particle. The open lumen is noted.

Figure 10A:
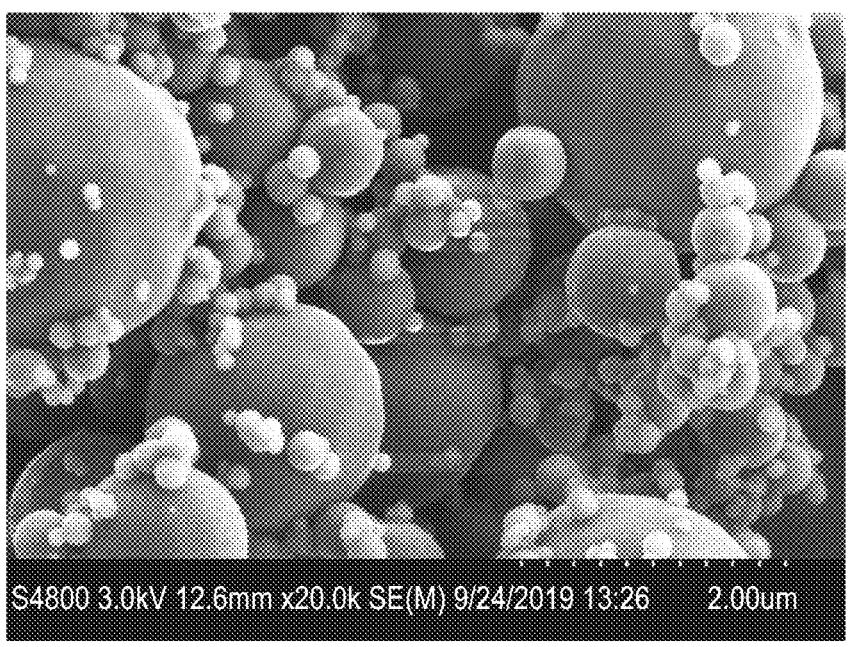

FIG. 10A shows an SEM image of MCM-41 particles.

Figure 10B:
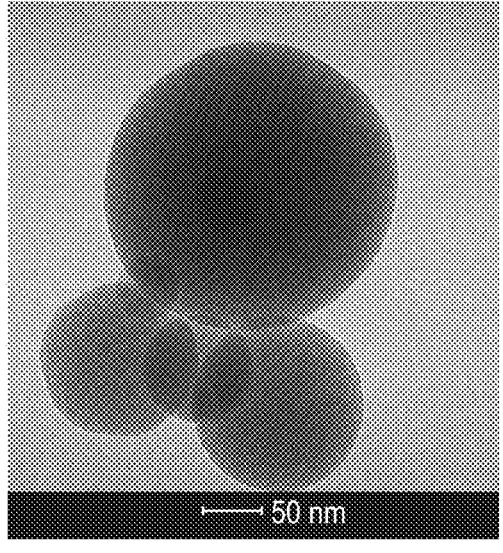

FIG. 10B shows a TEM image of MCM-41 particles.

Figure 11:
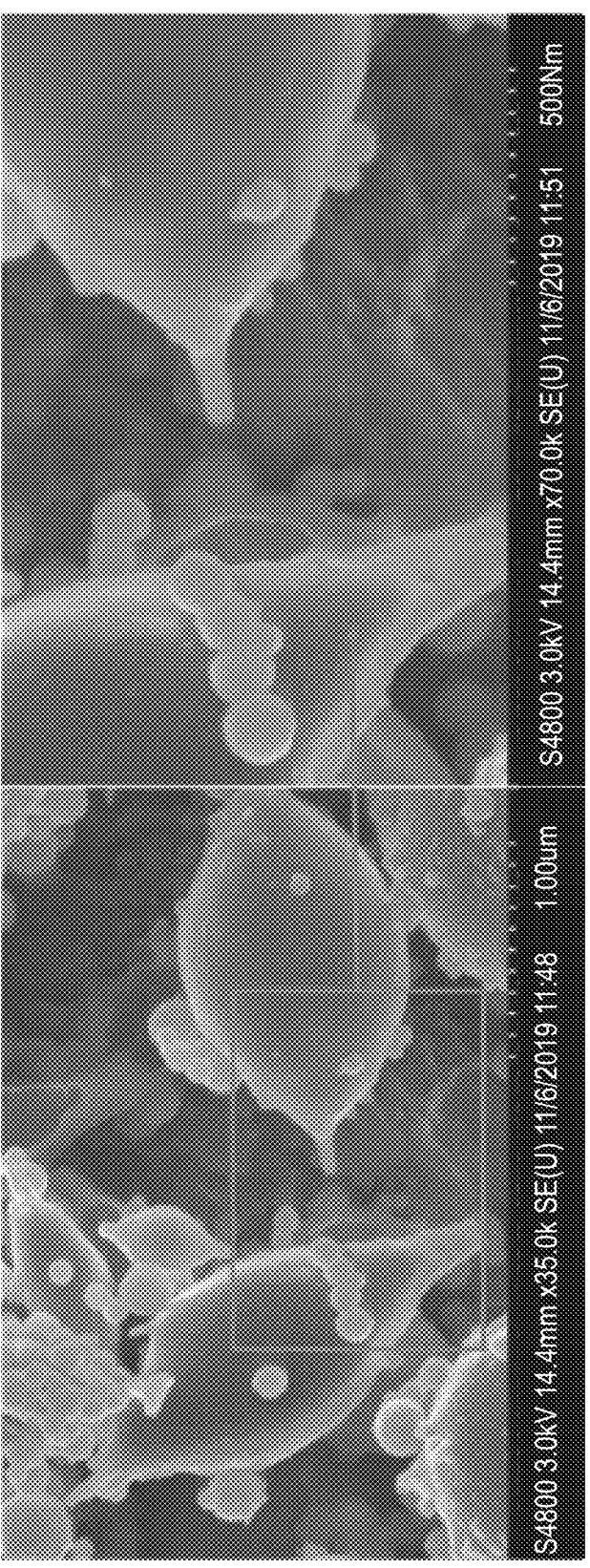

FIG. 11 shows SEM images of MCM-41/HNT composite particles of the disclosure.

Figure 12:
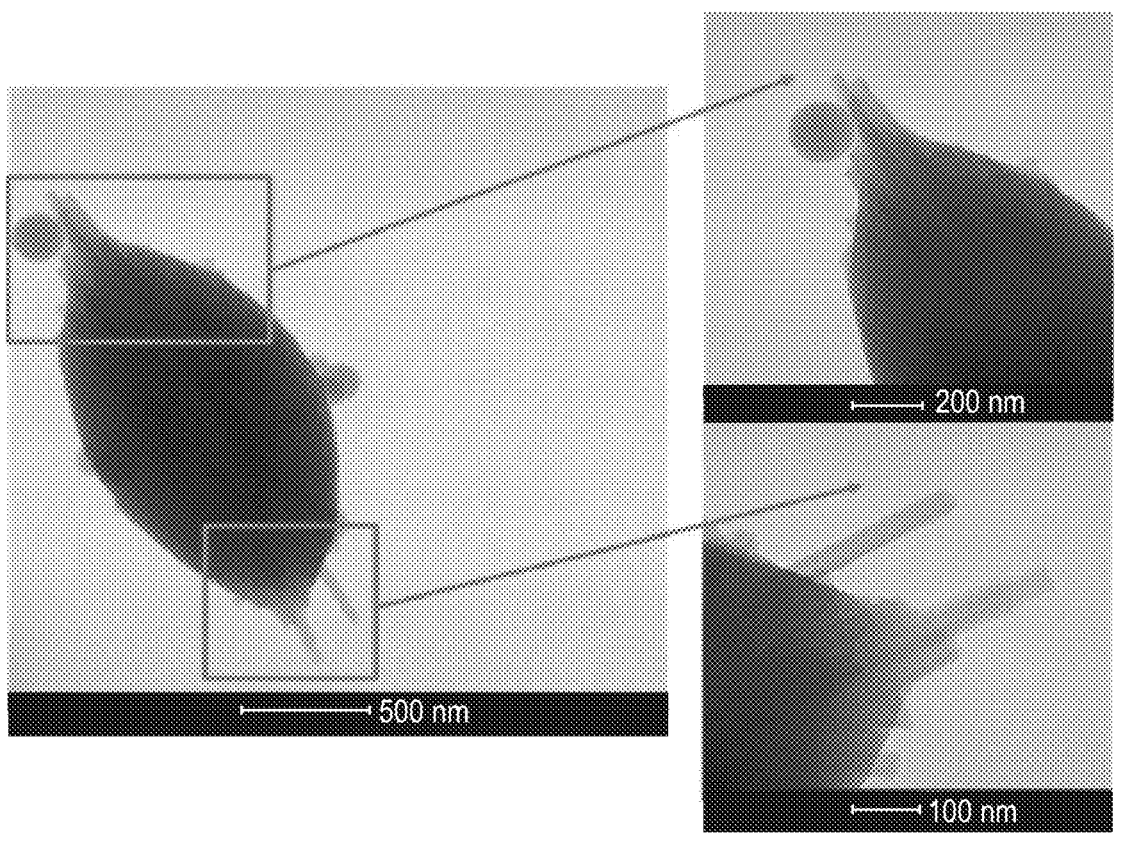

FIG. 12 shows TEM images of MCM-41/HNT composite particles of the disclosure.

Figures 13, 14:
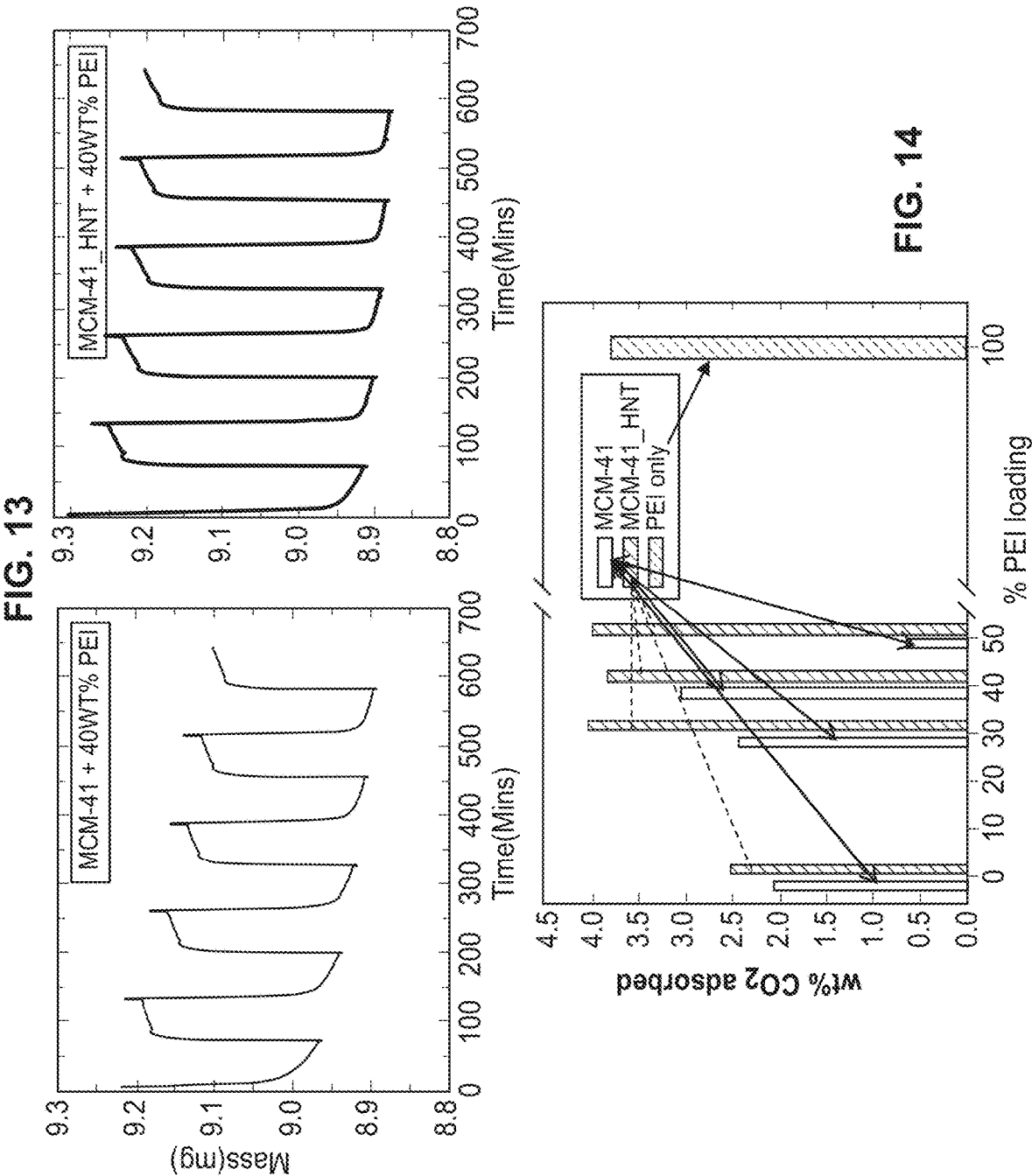

FIG. 13 are $CO_2$ adsorption curves for 40 wt. % PEI loaded MCM-41 sorbents (right) and MCM-41/HNT sorbents of the disclosure (left).

FIG. 14 shows the effects of PEI percentage loading on the $CO_2$ uptake capacities of PEI loaded MCM-41 sorbents and MCM-41/HNT sorbents of the disclosure.

Figure 15:
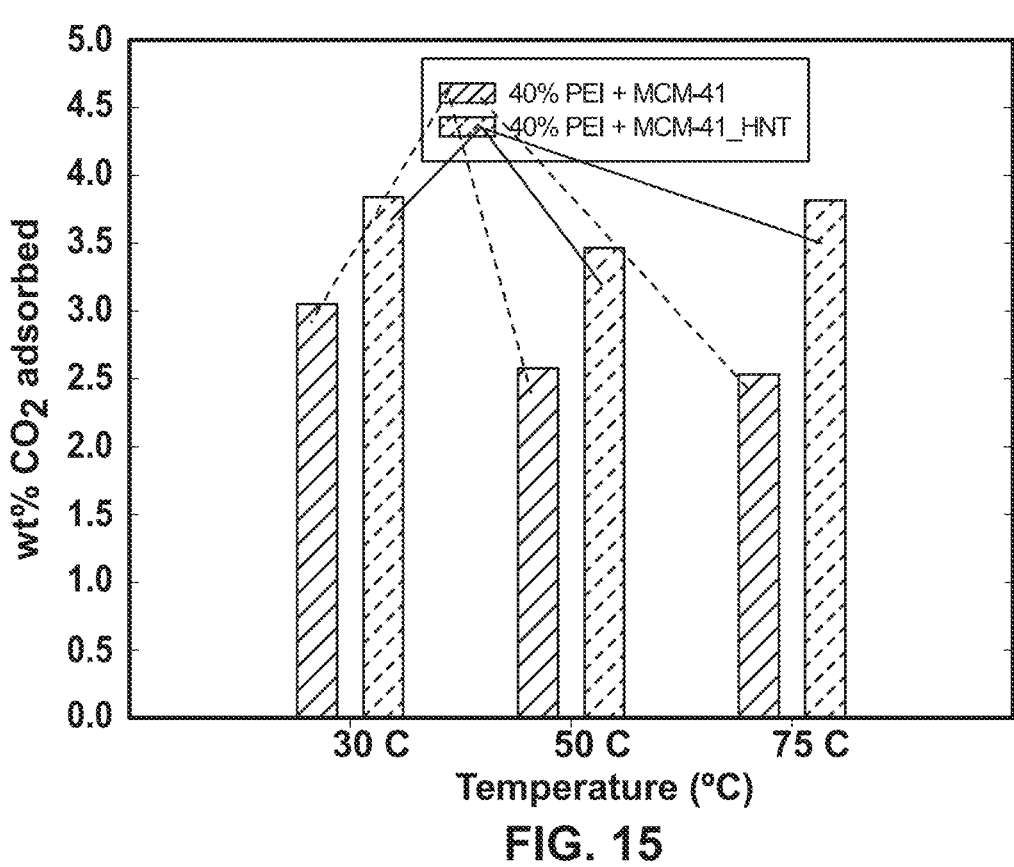

FIG. 15 shows the effects of temperature on the $CO_2$ uptake capacities of MCM-41 sorbents and MCM-41/HNT sorbents of the disclosure.

Figure 16:
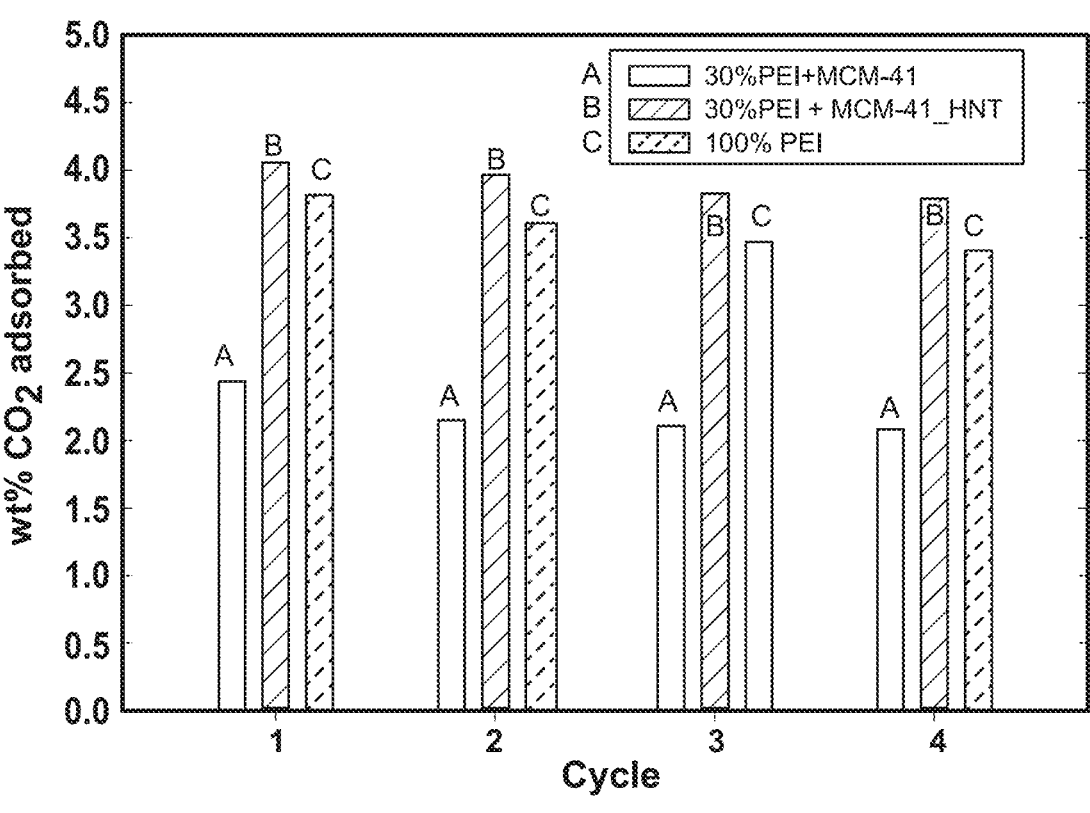

FIG. 16 shows the stability of PEI sorbents, PEI+MCM-41 sorbents, and PEI+MCM-41/HNT sorbents of the disclosure.

DETAILED DESCRIPTION

Detailed descriptions of embodiments are provided herein. It is to be understood, however, that the present disclosure may be embodied in various forms. Therefore, specific details disclosed herein are not to be interpreted as limiting, but rather as a basis for the claims and as a representative basis for teaching one skilled in the art to employ the present disclosure in any appropriate manner.

Wherever any of the phrases "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lumen of the nanotube is free of the porous particles" means "wherein the lumen of the nanotube is substantially free of the porous particles" so long as a lumen wholly free of the porous particles is not necessary for the nanotube to perform its function. In embodiments, "substantially free" means the lumen of the nanotube comprises less than 2%, less than 1%, less than 0.5%, less than 0.25%, or less than 0.1% of the volume of the lumen includes porous particles.

The terms "comprising," "including," "having," and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context. For example, whenever any of the terms, "a catalyst," "a fertilizer," "a nutrient," "a pesticide," "a pharmaceutical drug," "a ligand," and "a polymer" are used herein, they describe one or more types of catalysts, fertilizers, nutrients, pesticides, pharmaceutical drugs, ligands, and polymers, respectively.

The term "porous particle" used herein describes any particle comprising one or more pore of any size. Similarly, the term "porous particles" used herein describes one or more particle of any type that has one or more pore of any size. The term "porous" refers to the entirety of the particle such that the pores exist interspersed through the particle.

Whenever the phrase, "in the interior of the composition of matter," "inside the composition of matter," and the like are used herein, they are understood to mean inside the porous particle of the porous particle and nanotube structure. For instance, a catalyst inside the composition of matter is understood to mean that the catalyst is inside the porous particle, not inside the nanotube. The terms "inside the porous particle" and "embedded in the porous particle" are used interchangeably herein.

Whenever the phrases, "nanotubes inserted into the porous particles," "nanotubes inserted into a porous particle," and the like used herein, "inserted" is understood to mean that the nanotubes penetrate the surface of the porous particle such that some of the nanotube is exposed to the interior of the porous particle and some of the nanotube is exposed to the environment outside of the porous particle's interior and surface. This definition also allows for scenarios in which a majority of the length of the nanotube is either inside or outside of the porous particle, while the other side of the nanotube penetrates the surface of the porous particle but does not extend its length into the outside or the inside of the porous particle, respectively. Possible arrangements, but not all, arrangements of the nanotubes inserted in the porous particles are shown in FIG. 10.

The phrases "porous particle(s) with nanotubes," "porous particle(s) and nanotubes inserted into the porous particle(s)," and "composition of matter comprising a porous particle(s) and nanotubes inserted into the porous particles" used herein are interchangeable and have the same meaning.

The phrase "porous particle" within the context of catalytic reactions is understood to serve as the catalytic support or matrix.

The term "mesoporous particles" and the like used herein are understood to mean that the size of the pores within said particles are from 20 nm to 50 nm.

The term "microporous particles" and the like used herein are understood to mean that the size of the pores within said particles are less than 20 nm.

The term "MCM-41 particles" and the like used herein refer to Mobil Composition of Matter No. 41, a mesoporous silica material with a hexagonal array of pores that are from 2 nm to 4 nm.

Figure 1:
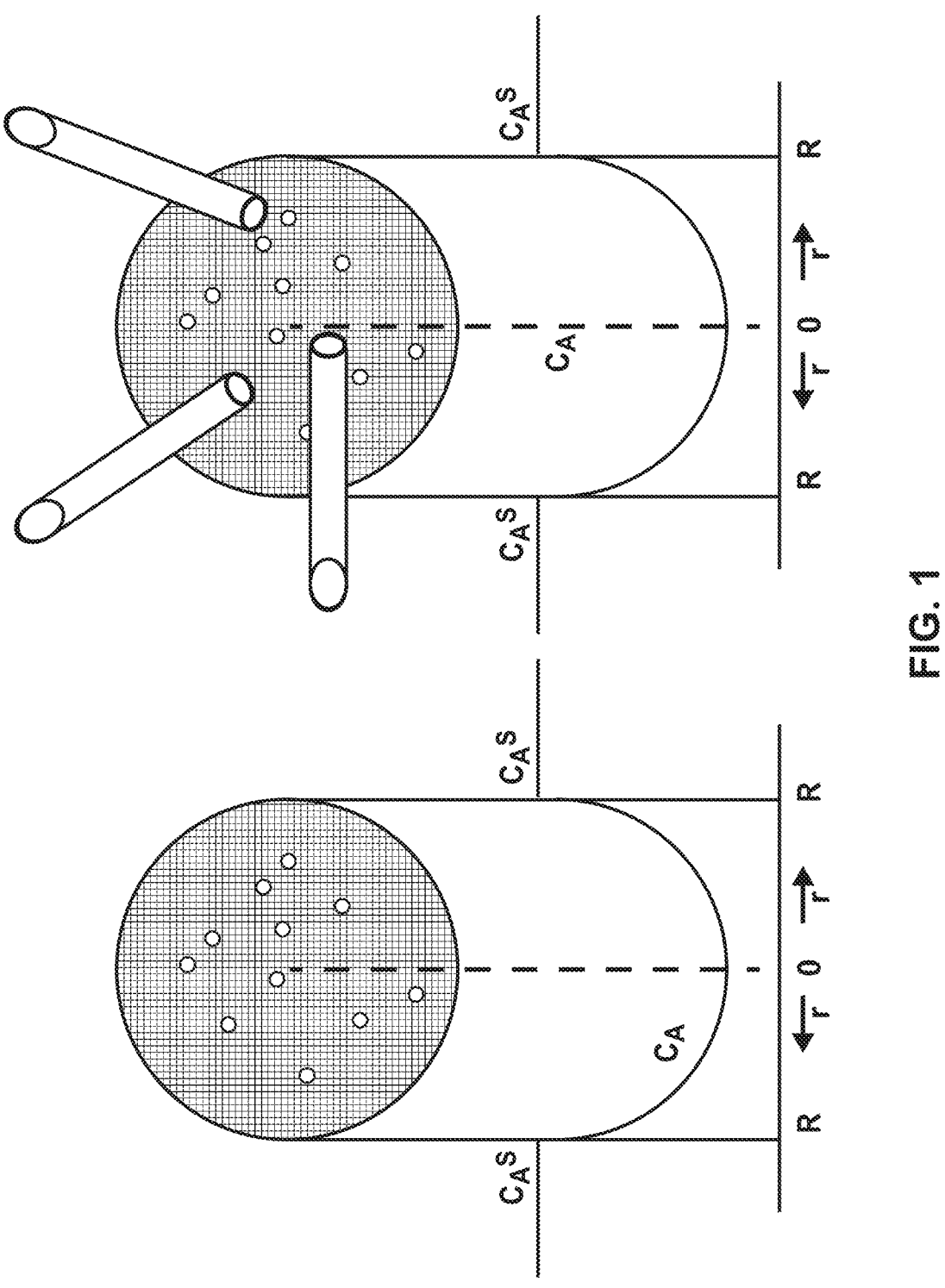
FIG. 1 provides a schematic of reaction and diffusion in a pellet without (left) and with (right) nanostraws penetrating the interior of said pellet. On the top, the pellet without nanostraws penetrating the interior exhibits reduced reactant concentration, exemplified by the concentration profile decrease across the interior, $$C_A < C_A^S.$$

The term "halloysite nanotubes" or "HNTs" and the like used herein refer to nanotubes comprising halloysite, a natural aluminosilicate clay. Naturally and as used herein, halloysite has a nanotubular morphology. Halloysite nanotubes constitute a 1:1 aluminosilicate clay mineral, chemically similar to kaolin with the empirical formula $Al_2Si_2O_5(OH)_4$. As shown in FIG. 4-6, halloysite nanotubes naturally occur as small scroll-like clay sheets which are caused by a lattice mismatch between the two different layers comprising the clay sheet. The external surface consists of siloxane (Si—O—Si) groups and the internal surface consists of aluminol (Al—OH) groups. The structural isomorphic substitution of Si for Al leads to the unequal charge distribution between the cationic Al-rich inner surface and the anionic Si-rich outer surface. Naturally occurring halloysite nanotubes have lengths varying from 0.5 μm to 10 μm, although a typical length is around 0.5-2 μm as shown in FIG. 1. The outer diameter of halloysite is 60-100 nm, while the inner lumen can range from 20 nm to 60 nm. Halloysites thus have aspect ratios ranging from 5 to 20. The spacing between the scrolled layers is 0.7 nm in the dehydrated state, leading to 10-15 sheets per nanotube. Halloysites are extremely inexpensive and widely available, although the quality of the lumen varies based on the vendor.

The terms "nanotubes," "nanostraws," and "nanoneedles," are used interchangeably and have the same meaning. As used herein, the terms "nanotubes," "nanostraws," and "nanoneedles" refer to a nanometer-scale tube-like structure comprising a cylindrical outer wall and an open lumen.

The term "silica precursor" refers to a reagent necessary for the synthesis of a silica compound. Examples of silica precursors include tetraorthosilicates such as tetraethyl orthosilicate (TEOS), tetramethyl orthosilicate, and tetrapropyl orthosilicate.

The term "templating surfactant" refers to a reagent that assists in templating the porous particles into an ordered form. Examples of templating surfactants include cetyltrimethylammoniumbromide (CTAB), hexadecyltrimethylammonium bromide, and polyethylene oxide-co-polypropylene oxide block copolymers.

The term "catalytic reaction" refers to any chemical reaction that uses a catalyst.

The term "aerosolize" or "aerosolization" refers to the process of converting a liquid into particles that may be suspended in the air. For instance, a solution may be aerosolized into a gas or into solution droplets.

The term "precursor solution" refers to the solution comprising a templating surfactant, a silica precursor, a solvent, and nanotubes. The precursor solution is aerosolized to droplets, which are then heated to make particles.

The term "deposit site" refers to the intended location of delivery of a plant active or a pharmaceutical drug. For instance, a deposit site of a plant active could be a plant leaf or more specifically, the interior of the plant cell. The plant active, which is initially inside the porous particle with nanotubes, is then delivered to the deposit site in the following manner: the porous particle with nanotubes attaches to part of the plant, such as a leaf, by means of the nanotubes serving as an anchor, the nanotubes penetrate the leaf to allow the plant active to travel from the interior of the porous particle to the interior of the deposit site, the plant leaf in this particular example.

The term "plant active" refers to any compound that alters the characteristics, growth, metabolism, and/or function(s) of a plant. For example, nutrients, such as vitamins and minerals, are plant actives. Pesticides and fertilizers are additional examples of plant actives.

The present disclosure describes a composition of matter comprising porous particles and nanotubes penetrating (e.g., inserted into) the porous particles. Various embodiments, consisting of different porous particles and nanotubes, are proposed herein and provide different structural and/or functional advantages and applications.

In one embodiment, the present disclosure describes a composition of matter comprising porous particles and nanotubes penetrating the porous particles. The nanotubes function as reinforced tunnels through which the entire interior of the porous particles are made accessible.

In embodiments, the nanotubes of the composition of matter comprising porous particles and nanotubes penetrating the porous particles have a lumen and the lumen is substantially free of the porous particle material. The lumen of the nanotubes of the composition of matter generally have an open lumen that is free of the material of the porous particles, however, the end of the lumen inserted into the porous particle material may have minor, incidental amounts of porous particle material around the end that protrude into the end of the lumen and such configurations are considered within the scope of the disclosure.

In some embodiments, the present disclosure describes a composition of matter comprising porous particles, nanotubes penetrating the porous particles, and a catalyst embedded in the porous particles. The catalyst may be placed inside the porous particles during or after the synthesis of the porous particles with nanotubes penetrating the porous particles. In some embodiments the catalyst is embedded within the porous particles but not within the nanotubes.

In some embodiments, the present disclosure describes a composition of matter comprising porous particles, nanotubes penetrating the porous particles, and a zeolite catalyst embedded in the porous particles. The zeolite catalyst may be placed inside the porous particles during the synthesis of the porous particles with nanotubes penetrating the porous particles. The inclusion of the zeolite catalyst within this structure provides a range of applications including, but not limited to, the following: Fischer-Tropsch for large molecule synthesis using iron (Fe) or iron (Fe)/zeolites, catalytic cracking and hydrocracking of large molecules using zeolites, platinum (Pt) reforming and lube oil isomerization using platinum (Pt)/zeolites, prevention of poisoning by sulfur compounds, hydrodesulfurization, biofuels upgrading, algae based biofuels, alkylation catalysts, and partial oxidation catalysts ($V_2O_5$). For instance, zeolite embedded in porous particles with nanotubes is highly advantageous in biomass conversion, as zeolites constitute an important catalytic material; however, zeolite use has not been fully capitalized on due to its highly porous structure. During pyrolysis of lignocellulosic biomass, heavy molecules of cellulose, hemicellulose and lignin decompose into liquid bio-oil. The bio-oil contains mostly aromatics with oxygen (oxygenates). The presence of oxygen in the bio-oil makes it acidic and corrosive for most engines and lowers its heating value as a fuel. Thus, the pyrolysis bio-oil is useless for transportation purposes. Oxygen can be removed from the bio-oil molecules through catalytic upgrading. Zeolite Socony Mobil-5 (ZSM-5) is recognized in the art as an effective catalyst for deoxygenations. Due to its highly acidic framework, ZSM-5 promotes deoxygenation reactions and converts the large bio-oil molecules into valuable aromatics, such as benzene, toluene and xylene (BTX). However, the disadvantage of ZSM-5 is the very small pore structure which poses diffusion limitations. As a result most of the bio-oil oxygenates cannot diffuse into the pores of ZSM-5 or they do not have enough time to diffuse out of the pores. Consequently, the yield to valuable aromatics is low and excessive coke formation deactivates the ZSM-5 rapidly. The porous support of the disclosure with nanotubes such as halloysites penetrating the porous particle can relax these diffusion limitations, by providing driveways to the ZSM-5 acid sites increasing the conversion to valuable products and reducing the coke formation, thus the longevity of the ZSM-5.

In embodiments, the present disclosure describes a composition of matter comprising MCM-41 particles, halloysite nanotubes penetrating the MCM-41 particles, and a zeolite catalyst embedded in the MCM-41 particles. These embodiments exhibit multiple advantages owing to the interaction between the matrix support material with the zeolite and is further enhanced by the functional and structural uses of the inserted halloysite. For one, the porous matrix provides mechanical strength. Alone, the zeolite crystals, such as ZSM-5, are very microporous, highly crystalline, and very fragile materials, especially under fluidization conditions. Embedding them in the porous support provides them with mechanical strength. Fluid Catalytic Cracking or Hydrocracking in the refinery are examples of such reactions that would benefit from the application of these zeolite-embedded porous particle with nanotube structures. Secondly, the porous support matrix provides hydrothermal stability. The high reaction temperatures of a reaction, especially in the presence of steam, can easily destroy the acidity and the pore structure of the zeolites. For example, during regeneration in a Fluid Catalytic Cracking unit, the catalysts are exposed at high temperatures, and hydrothermal stability is essential. Most importantly, the porous support reduces diffusion limitations. In many catalytic applications, like the Fluid Catalytic Cracking, the Hydrocracking or the Biomass conversion via pyrolysis, the reactants are bulky molecules, which cannot access the acid sites of the microporous zeolites, or they might access them, but not have enough time to diffuse out of the pores. That leads to coke formation which rapidly deactivates the catalyst (zeolites). The porous support with halloysites allows access of the reactants, and in most cases, drives the reactants in and out of the acid sites of the zeolites. In this way, the halloysites act like driveways. As a result, diffusion limitations are reduced, leading to increased conversion to useful products and less coke formation.

In some embodiments, the present disclosure describes a composition of matter comprising porous particles, nanotubes penetrating the porous particles, and a noble metal catalyst embedded in the porous particles during or after the synthesis of the porous particles with nanotubes inserted in the porous particles. Examples of noble metal catalysts include, but are not limited to, the following: platinum (Pt), palladium (Pd), and rhodium (Rh).

In some embodiments, the present disclosure describes a composition of matter comprising porous particles, nanotubes penetrating the porous particles, and transition metal clusters as the catalytic material embedded in the porous particles during or after (incipient wetness impregnation method) the synthesis of the porous particles.

In some embodiments, the present disclosure describes a composition of matter comprising porous particles, nanotubes penetrating the porous particles, and transition metal clusters ion exchanged into the zeolites embedded in the porous particles during or after (incipient wetness impregnation method) the synthesis of the porous particles. In some embodiments the zeolites are embedded in the porous particle but not in the nanotubes.

In some embodiments, the present disclosure describes a composition of matter comprising porous particles, nanotubes penetrating the porous particles, and a plant active embedded in the porous particles. In some embodiments, the present disclosure describes at least all the elements listed above, wherein the plant active is fertilizer, nutrients, and/or pesticide. The plant active may be placed inside the porous particles after the synthesis of the porous particles with nanotubes penetrating the porous particles. The deposit site of the plant active may be a plant leaf or more specifically, a plant cell. In some embodiments the plant actives are embedded in the porous particle but not in the nanotubes.

In some embodiments, the present disclosure describes a composition of matter comprising porous particles, nanotubes penetrating the porous particles, and a pharmaceutical drug embedded in the porous particles. The pharmaceutical drug may be placed inside the porous particles after the synthesis of the porous particles with nanotubes penetrating the porous particles. The deposit site of the pharmaceutical drug may be skin, such as human skin. In some embodiments the pharmaceutical drug is embedded in the porous particle but not in the nanotubes.

In some embodiments, the present disclosure describes a composition of matter comprising porous particles, nanotubes penetrating the porous particles, and ligands inserted into the porous particles. The ligands, like the nanotubes, penetrate the surface of the porous particle such that they project outside the porous particle, while some remains attached to the interior of and/or surface of the porous particle. In some embodiments the ligands are embedded in the porous particle but not in the nanotubes.

In embodiments, the ligands are those that can absorb environmental contaminants. Environmental contaminants can include, but are not limited to chlorinated compounds, phenolic compounds, pesticides, pharmaceuticals, oils, and surfactants. The ligands may be inserted into the porous particle via grafting or via diffusion with the pre-made porous particles with nanotubes. In the latter method, a solution comprising the ligand and the pre-made porous particle with nanotubes is made. The ligand is allowed to diffuse into the porous particle, and then the solvent is evaporated. When the solvent is evaporated, the ligand will stay in the particle. However, it cannot be re-contacted with water or solvent or it will diffuse back out again. In the former method, a ligand precursor is obtained or synthesized, and then it is allowed to diffuse into the porous particle. A reaction to covalently attach, or graft, the ligand to the surface of the porous particle is performed. This method ensures that the ligand will not detach if the structure is re-contacted with water or another solvent. It is possible to synthesize dendrimers of various generations by sending in precursors through the lumens of the halloysites.

In embodiments, the present disclosure describes a composition of matter comprising MCM-41 particles, halloysite nanotubes penetrating the MCM-41 particles, and ligands that can absorb environmental contaminants inserted into the porous particles.

In some embodiments, the present disclosure describes a composition of matter comprising porous particles, nanotubes penetrating the porous particles, and a polymer entrapped in the inside of the porous particles. The polymer may be inserted into the porous particle via grafting or via diffusion with the pre-made porous particles with nanotubes. In the latter method, a solution comprising the polymer and the pre-made porous particle with nanotubes is made. The polymer is allowed to diffuse into the porous particle, and then the solvent is evaporated. When the solvent is evaporated, the polymer will stay sequestered in the pores of the particle. However, it cannot be re-contacted with water or solvent or it will diffuse back out again. In the former method, a polymer precursor is obtained or synthesized, and then it is allowed to diffuse into the porous particle. A reaction to covalently attach, or graft, the polymer to the surface of the porous particle is performed. This method ensures that the polymer will not detach if the structure is re-contacted with water or another solvent. In some embodiments, the polymer is poly(ethyleneimine) (PEI), which is loaded into the particles by incipient wetness impregnation.

In embodiments, the present disclosure describes a composition of matter comprising MCM-41 particles, halloysite nanotubes penetrating the porous particles, and a poly(ethyleneimine) (PEI) entrapped in the inside of the porous particles.

In some embodiments, the present disclosure describes a composition of matter comprising silica porous particles and nanotubes penetrating the silica porous particles.

In some embodiments, the present disclosure describes a composition of matter comprising mesoporous particles and nanotubes penetrating the mesoporous particles. Mesoporous particles have pore diameters from 20 nm to 50 nm.

In some embodiments, the present disclosure describes a composition of matter comprising microporous particles and nanotubes penetrating the microporous particles. Microporous particles have pore diameters less than 20 nm.

In some embodiments, the present disclosure describes a composition of matter comprising MCM-41 particles and nanotubes penetrating the MCM-41 particles. MCM-41 (Mobil Composition of Matter No. 41) particles are mesoporous particles frequently used as a catalytic support.

In some embodiments, the present disclosure describes a composition of matter comprising MCM-48, MCM-50, SBA-11, SBA-12, SBA-15, SBA-16, KIT-5, or COK-12 particles and nanotubes penetrating the MCM-48, MCM-50, SBA-11, SBA-12, SBA-15, SBA-16, KIT-5, or COK-12 particles, respectively. Each of the aforementioned porous materials are silica materials.

In some embodiments, the present disclosure describes a composition of matter comprising porous particles and ceramic nanotubes penetrating the porous particles.

In some embodiments, the present disclosure describes a composition of matter comprising porous particles and ceramic nanotubes penetrating the porous particles.

In some embodiments, the present disclosure describes a composition of matter comprising porous particles and halloysite nanotubes penetrating the porous particles. The size (diameter) of the halloysites (driveways) can change, so the halloysites may effectively act as molecular sieves. In other words, halloysites of different diameters can be used to allow only a specific size of reactant to enter the porous particles and exclude others.

In embodiments, the present disclosure describes a composition of matter comprising MCM-41 particles and halloysite nanotubes penetrating the MCM-41 particles.

In one embodiment, the present disclosure provides a method of synthesis for the composition of matter comprising porous particles and nanotubes penetrating the porous particles from a precursor solution. The precursor solution includes a templating surfactant, a silica precursor, a solvent, and nanotubes. The liquid precursor solution is aerosolized into tiny droplets. The tiny droplets are heated to make particles, for example, by passing the droplets through a heated zone, which evaporates the solvent. In the heated zone, the silica precursor condenses into silica, and the templating surfactant templates the resulting porous particles into an ordered form. At the same time, in the confined environment of the droplet, when the solvent evaporates, there is nowhere for the nanotubes to go but into the porous particles that are being formed. Any excess reactants or side products formed are considered waste products. Waste products from the reaction can be separated from the final product, i.e., the porous particles and nanotubes penetrating the porous particles, by means of a filter.

In some embodiments of the present method, the nanotubes are comprised of aluminosilicate clay. In embodiments, the nanotubes are halloysite. In some embodiments of the present method, the silica precursor is cetyltrimethylammoniumbromide (CTAB). In some embodiments of the present method, the templating surfactant is tetraethyl orthosilicase (TEOS). In some embodiments of the present method, the solvent is comprised of 80% ethanol and 20% water, by volume. In some embodiments of the present method, the heated zone is between 200 and 600° C.

In some embodiments of the present method, a catalyst is added to the precursor solution. Like the nanotubes, within the confined environment of the droplet, the catalyst has nowhere to go except for inside the porous particles. By adding the catalyst to the precursor solution, the final product, i.e., porous particles and nanotubes and a catalyst inserted into the porous particles, may be used for a range of applications in catalytic reactions, such as, but not limited to, petroleum processing. In some embodiments, the catalyst is a noble metal. In some embodiment, the catalysts are transition metal clusters. In some embodiment, the aforementioned catalyst is a zeolite. In some embodiment, the catalysts are transition metal clusters ion exchanged into zeolites.

In embodiments of the present method, the templating surfactant is cetyltrimethylammoniumbromide (CTAB), the silica precursor is tetraethyl orthosilicase (TEOS), the solvent is 80% ethanol and 20% water by volume, and the nanotubes are halloysite. This specific combination of materials within the precursor solution yields halloysite nanotubes inserted into MCM-41 particles. The use of cetyltrimethylammoniumbromide (CTAB) into a solution of tetraethyl orthosilicate (TEOS) and ethanol/water (80/20) leads to the formation of highly ordered and high surface area, mesoporous MCM-41. Tetraethyl orthosilicate (TEOS) is used as a source of silica. The ethanol/water (80/20) solvent is used to solvate cetyltrimethylammoniumbromide (CTAB) and tetraethyl orthosilicate (TEOS). It is important that the combination of these materials is in a solution form so that it may be aerosolized. Aerosolization is important in that it converts the solution into droplets, and in this environment, the halloysite nanotubes have nowhere else to go but into the forming MCM-41 particles. Furthermore, the cationic interior of the halloysite nanotube prevents adsorption of CTAB thus leaving the tube interior clean. Thus, in embodiments, the nanotubes penetrating the porous particles are free of MCM-41 in the lumen of the nanotubes. As the droplets of the solution go through the heated zone, the solvent evaporates and tetraethyl orthosilicate (TEOS) condenses to silica with cetyltrimethylammoniumbromide (CTAB) templating the material to the ordered mesoporous MCM-41 material with spherical morphologies as shown in FIG. 3. The inherent polydispersity in particle size is an inherent feature of the aerosol process which can be controlled by nozzle size. But in the applications described herein, polydispersity is not a disadvantage. As such, in some embodiments, simple nozzles obtained from hospital inhalator supplies, which are very inexpensive, may be used. The noble metal or transition metal catalysts are loaded into the particles after the aerosolization step by incipient wetness impregnation, whereas the zeolites are added to the precursor solution before aerosolization.

In one embodiment, the composition of matter comprising porous particles and nanotubes penetrating the porous particles is used to optimize catalytic reactions. A catalyst is embedded in the porous particle with nanotubes as described above. The nanotubes inserted into the porous particles serve to decrease the diffusion limitations present in catalytic pellets by allowing the external reactant concentration to be achievable at all points in the pellet. The terms "reactant(s)" and "reagent(s)" are used interchangeably herein. As shown in FIG. 1, when the reaction is diffusion limited, the interior concentration of reactant A decreases considerably, and the reaction is less efficient in the interior of the pellet. This leads to a waste of catalytic materials in the interior of the pellet. The nanotubes penetrating the porous particles enable reactants to easily diffuse into the pellet and products to easily diffuse out of the pellet, making it an ideal application in catalytic reactions requiring large reagents or producing large products such as in chemical processing, hydrocarbon processing, bioprocessing, and fine chemicals and pharmaceuticals reactions. In some embodiments, the catalyst embedded in the porous particle with nanotubes is a zeolite. In other embodiments, the catalyst embedded in the porous particle with nanotubes is a noble metal. In other embodiments, the catalyst embedded in the porous particle with nanotubes are transition metal clusters. In other embodiments, the catalyst embedded in the porous particle with nanotubes are transition metal clusters ion exchanged into zeolite. In some embodiments, the reagents are hydrocarbons. In embodiments, the composition of matter comprising MCM-41 particles and halloysite nanotubes inserted in the MCM-41 particles is used to optimize catalytic reactions, wherein zeolite is used as the catalyst inserted into the interior of the MCM-41 particle with nanotubes.

In one embodiment, the composition of matter comprising porous particles and nanotubes penetrating the porous particles is used to deliver a plant active. The plant active is inserted into the interior of the porous particles with nanotubes. The nanotubes act as needles for the adherence of the porous particles to surfaces. The nanotubes penetrate the deposit site to deliver the plant active by means of the nanotubes enabling the plant active to be transported from the interior of the porous particles to the deposit site. For instance, in some embodiments, the deposit site may be plant leaves or more specifically, a plant cell. Spraying these particles on plant leaves will allow penetration into plant cells and will keep the particles attached and not roll off during rain events. In some embodiments, the plant active is loaded into pre-made porous particles with nanotubes. Porous particles with nanotubes are incubated in a solution comprising the plant active so that the plant active diffuses into the interior of the porous particles. Usually the active is dissolved in a solvent, typically water for water soluble actives such as fertilizers, or in an organic solvent such as chloroform or methylene chloride for pesticides. Slow evaporation of the solvent at ambient temperature (about 23° C.) or higher (e.g., up to about 30, 35, 40, 45, 50, 55 or 60° C.), to speed up the process, leads to loading. As the solvent is evaporated, the concentration of the active increases, and there is a driving force for the active to enter the pores of the composite. Eventually all the solvent is evaporated off and the material is in the pores and in a dry state. In some embodiments, the plant active is a fertilizer, nutrient, and/or a pesticide. In some embodiments, the deposit site is a plant leaf or stem. In some embodiments, the deposit site is a plant cell. In embodiments, the plant active can be delivered to a plant by spraying the plant with the composition of matter loaded with a plant active and a carrier. In embodiments, the carrier is a liquid.

In one embodiment, the composition of matter comprising porous particles and nanotubes penetrating the porous particles is used to deliver a pharmaceutical drug. The pharmaceutical drug can be delivered to a human or animal by administering a composition comprising the composition of matter comprising porous particles and nanotubes penetrating the porous particles and a pharmaceutical drug embedded in the porous particles and a pharmaceutical carrier to a human or animal. The pharmaceutical drug is embedded in the porous particles with nanotubes. The nanotubes act as needles for the adherence of the porous particles to surfaces. The nanotubes penetrate the deposit site to deliver the pharmaceutical drug by means of the nanotubes enabling the pharmaceutical drug to be transported from the interior of the porous particles to the deposit site. For instance, in some embodiments, the deposit site may be human skin or more specifically, a human cell. In some embodiments, the pharmaceutical drug is loaded into pre-made porous particles with nanotubes. Porous particles with nanotubes are incubated in a solution comprising the pharmaceutical drug and a solvent so that the pharmaceutical drug diffuses into the interior of the porous particles. Evaporation of the solvent through gentle warming will lead to full loading. In some embodiments, the deposit site is the skin of a human or other animal. In some embodiments, the deposit sites are the cells of one or more orangs of a human or other animal. In embodiments, the composition of matter comprising porous particles and nanotubes inserted in the porous particles having a pharmaceutical drug embedded in the porous particles can be prepared by incubating the composition of matter comprising porous particles and nanotube penetrating the porous polymers in a solution comprising a pharmaceutical drug and evaporating the solvent. In embodiments, the solvent is evaporated at about 23° C. or higher (e.g., up to about 30, 35, 40, 45, 50, 55 or 60° C.).

In one embodiment, the composition of matter comprising porous particles and nanotubes penetrating the porous particles, with the addition of ligands that have been functionalized in the pores of the porous particles, is used to absorb environmental contaminants. These ligands can be prepared in many ways. For instance, a ligand precursor may be obtained or synthesized. The ligand precursor is diffused into the interior of the porous particle by traveling from the exterior of the porous particle, through the nanotubes, and into the interior of the porous particles. It is possible to synthesize dendrimers of various generations, for instance, by sending in precursors through the lumens of the nanotubes. Then, the ligand precursor is grafted to the surface of the porous particle through a reaction to covalently attach the ligand precursor to the surface. Grafting allows for the attachment of the ligand to the surface so that it will not come off and so that the other end of the ligand is free to attach to another compound. Alternatively, the ligand molecule may be added to a solution with the porous particles with nanotubes and allowed to diffuse into the porous particle. When the solvent is evaporated away, the ligand will stay in the particle. However, the ligand cannot be re-contacted with water (or solvent) or it will diffuse back out. Thus, if the ligand is inserted into the porous particles in this way, it cannot be used in aqueous or highly humid environments to absorb environmental contaminants. In either method, the ligand can remain entrapped in the interior of the porous particle or, like the nanotubes, penetrate the surface of the porous particle such that some of the ligand is exposed to the interior of the porous particle and some of the ligand is exposed to the environment outside of the porous particle's interior and surface. The ligand can be functionalized so that it may absorb specific environmental contaminants, and thus by simply placing the porous particles with nanotubes and ligands in contact with the environmental contaminants, they can be absorbed. In some embodiments the environmental contaminants are pharmaceutical contaminants (e.g., Koopaei et al., "Health risks associated with the pharmaceuticals in "wastewater", published April 2017) or textile dye contaminants (e.g., Tichonovas et al, "Degradation of various textile dyes as wastewater pollutants under dielectric barrier discharge "plasma treatment", published August 2013).

In embodiments, the porous particles are MCM-41, the nanotubes penetrating the MCM-41 are halloysite, and the ligands are any ligands that absorb or assist in absorbing environmental contaminants.

In one embodiment, the composition of matter comprising porous particles and nanotubes penetrating the porous particles, with the addition of carbon dioxide ($CO_2$)-capturing polymers and/or compounds entrapped in the interior of the porous particles, is used to capture carbon dioxide ($CO_2$). The polymers and/or compounds are sent into the interior of the porous particle by traveling through the nanotubes via diffusion as described above. The polymers and/or compounds remain entrapped in the interior of the porous particle, and the pores and/or nanotubes allow carbon dioxide ($CO_2$) to enter the interior of the porous particle. The carbon dioxide ($CO_2$) is thus then captured in the interior due to the presence of the polymers and/or within the interior. The efficiency of carbon dioxide ($CO_2$) is thus significantly increased.

Suitable $CO_2$-capturing polymers and/or compounds can include aminated polymers and/or compounds, including, but not limited to, monoethanolamine, triethanolamine, diethanolamine, diethylenetriamine, tetraethylenepentamine, tetraethylenepentamine-acrylonitrile, 3-aminopropytriethyoxysilane, poly(ethyleneimine), or a combination of the foregoing. In embodiments, the aminated compound comprises monoethanolamine, triethanolamine, diethanolamine, diethylenetriamine, tetraethylenepentamine, tetraethylenepentamine-acrylonitrile, 3-aminopropytriethyoxysilane, or a combination of the foregoing. The capture of $CO_2$ by amine sorbents involves both physisorption and chemisorption. Chemisorption occurs by the formation of carbamate or the formation of bicarbonates in the presence of water.

In embodiments, the porous particles are MCM-41, the nanotubes penetrating the porous particles are halloysite, and the polymers are poly(ethyleneimine) (PEI).

In embodiments, the disclosure provides a method of capturing $CO_2$ and converting calcium oxide (CaO) into calcium carbonate ($CaCO_3$) comprising contacting the composition of matter of the disclosure comprising the porous material comprising calcium oxide and comprising nanotubes penetrating the porous material with carbon dioxide ($CO_2$).

The composition of matter of the disclosure comprising a porous material comprising calcium oxide and comprising nanotubes penetrating the porous material can be prepared by aerosolizing a precursor solution comprising a salt comprising calcium, a solvent, and nanotubes into droplets; and heating the droplets to make particles.

In embodiments, heating the droplets further provides waste products and the method further comprises separating the particles from the waste products using a filter. In embodiments, the salt comprising calcium is calcium hydroxide ($Ca(OH)_2$). In embodiments, the nanotubes are ceramic. In refinements of the foregoing embodiment, the nanotubes are halloysite. In embodiments, the solvent is ethanol/water (80/20 by volume). In embodiments, the heating is at a temperature of about 200° C. to about 600° C. In some embodiments, the salt comprising calcium is calcium hydroxide, the solvent is ethanol/water (80/20 by volume), and the nanotubes are halloysite.

In general, compositions of matter of the disclosure can be prepared as follows. 100 parts by weight templating surfactant can be dissolved in a volume of ethanol followed by the addition of about 33 parts by weight nanotubes, based on the total parts templating surfactant. The resulting mixture can be sonicated in a bath sonicator for about 3 minutes, about 5 minutes, about 10 minutes about 15 minutes, about 20 minutes, about 30 minutes, or about an hour to allow even dispersion. The silica precursor can be added dropwise into the mixture (at a volume that is about 40-50% the volume of the ethanol), followed by 0.1 M HCl (at a volume that is about 20% of the volume of the ethanol) to provide the precursor solution. The precursor solution can stir for about 3 minutes, about 5 minutes, about 10 minutes, about 15 minutes, about 20 minutes, about 30 minutes, or about an hour. The precursor solution can then be placed in a nebulizer and atomized using nitrogen gas as the carrier gas through a furnace operating isothermally at about 400° C. to provide dry porous composite particles. The dry porous particles can be collected at the other end of the furnace by a filter, as illustrated in FIG. 2. The recovered particles can be calcined in air at about 550° C. for about 5 hours at a ramping rate of 5° C./min to remove the surfactant template.

Polymers can be incorporated into the compositions of matter of the disclosure by incipient wetness impregnation. To achieve 20 wt. % polymer loading, 25 parts polymer (per 100 parts of the composition of matter) can be dissolved in ethanol at about 50° C. 100 parts of the composition of matter can be dispersed in the polymer solution and the mixture sonicated in a bath sonicator for about 3 minutes, about 5 minutes, about 10 minutes, about 15 minutes, about 20 minutes, about 30 minutes, or about an hour. The resulting slurry can stir at about 50° C. for about 12 hours (for example, between about 1 hour and about 24 hours) before transferring the slurry to a rotavapor. The solvent can then be removed under vacuum at about 150 mbar, to completely evaporate the solvent and load the polymer in the composition of matter.

EXAMPLES

Example 1: Aerosol Assisted Synthesis of MCM-41/HNT Composite Particles

Composite MCM-41/HNT particles were prepared as follows. 1.5 g of CTAB surfactant was dissolved in 10 ml of ethanol followed by the addition of 0.5 g halloysite nanotubes (HNTs). The resulting mixture was placed in a bath sonicator for 10 minutes to allow even dispersion. 4.5 ml of TEOS was added drop wise into the mixture, followed by 2 ml of 0.1 M HCl to provide the precursor solution. The precursor solution was allowed to stir for 10 minutes. The precursor solution was then placed in a nebulizer and atomized using nitrogen gas as the carrier gas through a furnace operating isothermally at 400° C. to provide dry porous composite particles. The dry porous particles were collected at the other end of the furnace by a filter, as illustrated in FIG. 2. The recovered particles were calcined in air at 550° C. for 5 hours at a ramping rate of 5° C./min to remove the surfactant template. MCM-41 particles not including HNTs were also prepared as a control using the same methodology and quantities of reagents, except for the inclusion of the HNTs.

The morphology of the MCM-41 and MCM-41/HNT sorbents materials were visualized using Scanning Electron Microscopy (SEM, Hitachi S-4800 field emission scanning electron microscope operated at 3 kV, or equivalent) and Transmission Electron Microscopy (TEM, FEI Tecnai G2 F30 twin transmission electron microscope operated at 300 kV, or equivalent). X-ray diffraction (XRD, Siemens, d 500, using Cu Kα radiation at 1.54 Å, or equivalent) was performed to obtain structural information of the particles. Surface area and porosity was determined via nitrogen gas sorption and desorption analysis (Micromeritics, ASAP 2010, or equivalent). The surface area was obtained using the Brunauer-Emmett-Teller (BET) method and the results are provided in Table 1, below.

The SEM (FIG. 10A) and TEM (FIG. 10B) images of the MCM-41 particles showed that the particles were polydisperse in size with particles ranging from 50 nm to 3 μm, and have a spherical morphology.

The SEM (FIG. 11) and TEM (FIG. 12) images of the MCM-41/HNT composite particles showed that the particles had straw-like HNTs sticking out at multiple points in each particle and most particles were "popsicle" shaped, rather than spherical like the MCM-41 particles. The HNT straws sticking out of the porous MCM-41 particles can be seen in the high resolution TEM image of the composite material in FIG. 12.

TABLE 1

| | BET Surface Area analysis | |
| --- | --- | --- |
| SAMPLE | BET Surface Area (m²/g) | Pore Volume (cm³/g) |
| MCM41 | 1380 | 0.11 |
| MCM41 + HNT | 1066 | 0.23 |

As shown in Table 1, there was not a significant reduction in the high surface area that is characteristic of MCM-41 upon incorporation of the HNT straws into the MCM-41. Total pore volume increased by a factor of 2 for the composite material including the HNT relative to the bare MCM-41 material, due to the large lumen of the HNTs.

Thus, Example 1 shows the preparation of the composition of matter of the disclosure, comprising porous particles and nanotubes inserted in the porous particles, according to the method of the disclosure.

Example 2: PEI Loading in MCM-41 & MCM-41/HNT Particles

Poly(ethyleneimine) (PEI) was incorporated into the MCM-41 and MCM-41/HNT materials of Example 1 by incipient wetness impregnation. To achieve 20 wt. % PEI loading 40 mg PEI was dissolved in 5 ml ethanol at 50° C. and 160 mg of the MCM-41 or MCM-41/HNT sorbent material was dispersed in the PEI solution and the mixture was placed in a bath sonicator for 10 minutes. The slurry was then allowed to stir at 50° C. for 12 hours before transferring the slurry to a rotavapor. Loading of the PEI into the sorbent materials was then carried out by removing the solvent under vacuum at 150 mbar, which allowed for total solvent evaporation.

Characterization was carried out on PEI loaded particles to estimate the weight percent of PEI in each sorbent type (MCM-41 and MCM-41/HNT) using thermogravimetric analysis (TGA) on a TA Instruments SDT 2960, or equivalent, operated at a heating rate of 5° C./min. Weight loss analysis was taken between 26° C. and 700° C. for each run.

Thus, Example 2 shows loading of the PEI into the composition of matter of the disclosure, comprising porous particles and nanotubes inserted in the porous particles, according to the method of the disclosure.

Example 3: CO₂ Adsorption

The $CO_2$ adsorption and desorption capacities were determined using TGA analysis of weight change to the PEI loaded MCM-41 and MCM-41/HNT sorbent materials upon introduction of $CO_2$ at low temperatures (adsorption) and the introduction of $N_2$ gas at higher temperatures (desorption).

Approximately 10 mg of PEI loaded sorbent was weighed into the TGA platinum pan. The sorbent was first heated at 10° C./min to 110° C. under $N_2$ gas and then isothermal for 1 hour to remove any adsorbed gases or moisture. The temperature was then ramped down to 30° C. before dosing pure $CO_2$ gas at 100 ml/min. This step was allowed to proceed for 1 hour to ensure total $CO_2$ adsorption. $CO_2$ desorption was then achieved by ramping up the temperature to 110° C. at 10° C./min under $N_2$ gas. $CO_2$ adsorption and desorption cycles were repeated at least 3 cycles for each sorbent.

As shown in FIG. 13, for each of the MCM-41 and MCM-41/HNT sorbents, the $CO_2$ adsorption and desorption takes place very rapidly and the adsorption levels are fairly consistent over each cycle and the mass of adsorbed $CO_2$ gas is higher for the MCM-41/HNT composite sorbent compared to the MCM-41 sorbent.

An in-depth analysis of the $CO_2$ uptake capacities of the MCM-41 and the MCM-41/HNT sorbents based on the amounts PEI loaded showed that without any PEI loading, both solid sorbent materials are both capable of adsorbing $CO_2$ molecules by physisorption up to 2 wt. % due to their porosity and large surface area and that incorporating PEI up to 40 wt. % into the porous solid sorbents increased their $CO_2$ uptake capacities above 3 wt. % to levels similar to the uptake for pure PEI liquids, as shown in FIG. 14.

For all levels of PEI loading, the MCM-41/HNT composite sorbent performed better compared to the MCM-41 sorbent which is attributed to the HNT straws providing a pathway for PEI molecules to penetrate the interior of the MCM-41 and subsequent ease of diffusion of $CO_2$ molecules into these inner pores. This can be seen at very high PEI loading (50 wt. %), where the $CO_2$ uptake for the MCM-41 sorbent drops drastically to below 1 wt. %, which that for the composite MCM-41/HNT sorbent was about 4 wt. % (FIG. 14). The decrease in $CO_2$ uptake for the MCM-41 at 50 wt. % PEI loading can be explained by the blockage of the pores of MCM-41 by the large PEI molecules, preventing the diffusion of $CO_2$ molecules. In contrast, the HNTs of the MCM-41/HNT sorbents provide access to additional pore volume for PEI sequestration and $CO_2$ diffusion. The uptake for MCM-41/HNT sorbent at 30-50 wt. % PEI loading surpassed those earlier reported for PEI impregnated MCM-41 sorbents, that had a maximum $CO_2$ uptake of 2.5 wt. % at 50 wt. % PEI loading. TGA weight loss analysis was done to investigate if the levels of PEI loading are the same in the MCM-41 and MCM-41/HNT materials at each specific PEI loading. The results shown in Table 2, below, confirmed that the PEI loading levels are the same for both MCM-41 and MCM-41/HNT sorbents for the 40 and 50 wt. % PEI loading. Thus, the superior $CO_2$ adsorption capabilities of the MCM-41/HNT sorbent material attributable to the provision of an ease of passage for PEI and $CO_2$ molecules to access inner sites of MCM-41 pores through the HNT straws.

TABLE 2

| Summary of weight loss from TGA analysis | |
| --- | --- |
| Sample | Weight loss (%) |
| Bare MCM-41_HNT | 1.8 |
| Bare MCM-41 | 0.8 |
| 40% PEI + MCM-41_HNT | 36.6 |
| 40% PEI + MCM-41 | 39.4 |
| 50% PEI + MCM-41_HNT | 45.7 |
| 50% PEI + MCM-41 | 46.8 |

The uptake of $CO_2$ by 40 wt. % MCM-41 and MCM-41/HNT sorbents were studied across 3 different temperatures (30, 50, and 75° C.) to determine if temperature plays a role in the uptake capabilities of these sorbents. Generally, the uptake is higher at lower temperature which can be explained by the additional physisorption of $CO_2$ at sites not occupied by PEI which is favored at low temperatures as seen in FIG. 15. The MCM-41/HNT sorbent had superior uptake capabilities across all temperatures studied compared to the MCM-41 sorbent, and the reduction in adsorption capabilities at 75° C. is more pronounced for the MCM-41 sorbent, relative to the MCM-41/HNT sorbent.

The stability of the sorbents was also observed over four $CO_2$ adsorption and desorption cycles at 30° C. and the results are shown in FIG. 16. 14.5% adsorption efficiency loss after the 4th cycle for the MCM-41 material, 10.7% adsorption efficiency loss after the 4th cycle for PEI, and only 6.5% adsorption efficiency loss after the 4th cycle for the MCM-41/HNT material, showing the MCM-41/HNT material is the most stable.

Thus, Example 3 shows the ability of the composition of matter of the disclosure, comprising porous particles and nanotubes inserted in the porous particles, having PEI loaded therein to adsorb $CO_2$. Further, Example 3 shows that the HNT straws with lumen between 10-30 nm allow passage of $CO_2$ into the interior pores of the particles and demonstrate superior $CO_2$ uptake, relative to particles with no HNT straws, across all investigated adsorption temperatures and PEI loadings.

EMBODIMENTS

In one aspect, the disclosure provides a composition of matter comprising porous particles and nanotubes inserted into the porous particles.

The composition of paragraph [0122], further comprising catalysts embedded in the porous particles.

The composition of paragraph [0121], wherein the catalysts are zeolites.

The composition of paragraph [0121], wherein the catalysts are noble metals.

The composition of paragraph [0121], wherein the catalysts are transition metal clusters.

The composition of paragraph [0121], wherein the catalysts are transition metal clusters ion exchanged into zeolites.

The composition of matter of paragraph [0120], further comprising a plant active inside the porous particles.

The composition of matter of paragraph [0126], wherein the plant active is a fertilizer.

The composition of matter of paragraph [0126], wherein the plant active is a nutrient.

The composition of matter of paragraph [0126] wherein the plant active is a pesticide.

The composition of matter of paragraph [0120], further comprising a pharmaceutical drug inside the porous particles.

The composition of matter of paragraph [0120], further comprising ligands inserted into the porous particles through the nanotubes.

The composition of matter of paragraph [0131], wherein the ligands can absorb environmental contaminants.

The composition of matter of paragraph [0120], further comprising polymers inserted into the porous particles through the nanotubes.

The composition of matter of paragraph [0133], wherein the polymers are poly(ethyleneimine) (PEI).

The composition of matter of paragraph [0120], wherein the porous particles are calcium oxide (CaO).

The composition of matter of paragraph [0120], wherein the porous particles are silica.

The composition of matter of paragraph [0120], wherein the porous particles are mesoporous.

The composition of matter of paragraph [0120], wherein the porous particles are microporous.

The composition of matter of paragraph [0120], wherein the porous particles are MCM-41.

The composition of matter of paragraph [0120], wherein the porous particles are selected from the group comprising: MCM-48, MCM-50, SBA-11, SBA-12, SBA-15, SBA-16, KIT-5, and COK-12.

The composition of matter of paragraph [0120], wherein the nanotubes are ceramic.

The composition of matter of paragraph [0120], wherein the nanotubes are halloysite.

The composition of matter of paragraph [0120], wherein the porous particles are MCM-41 and the nanotubes are halloysite.

In another aspect, the disclosure provides a method for creating the composition of matter of paragraph [0120], comprising combining a templating surfactant, a silica precursor, a solvent, and nanotubes to make a precursor solution; aerosolizing the precursor solution into droplets; and heating the droplets to make particles.

The method of paragraph [0144], further comprising separating the particles from waste products of the method using a filter.

The method of paragraph [0144], further comprising adding catalysts to the precursor solution.

The method of paragraph [0146], wherein the catalysts are zeolite.

The method of paragraph [0146], wherein the catalysts are noble metals.

The method of paragraph [0146], wherein the catalysts are transition metal clusters.

The method of paragraph [0146], wherein the catalysts are transition metal clusters ion exchanged into zeolites.

The method of paragraph [0144], wherein the nanotubes are ceramic.

The method of paragraph [0144], wherein the nanotubes are halloysite.

The method of paragraph [0144], wherein the templating surfactant is cetyltrimethylammoniumbromide (CTAB).

The method of paragraph [0144], wherein the silica precursor is tetraethyl orthosilicase (TEOS).

The method of paragraph [0144], wherein the solvent is ethanol/water (80/20).

The method of paragraph [0144], wherein the precursor solution is heated between 200-600 degrees Celsius, inclusive.

The method of paragraph [0144], wherein the templating surfactant is cetyltrimethylammoniumbromide (CTAB), the silica precursor is tetraethyl orthosilicase (TEOS), the solvent is ethanol/water (80/20), and the nanotubes are halloysite.

The disclosure further provides a method for optimizing catalytic reactions comprising: preparing the composition of matter of paragraph [0121]; and placing the composition of matter of paragraph [0121] in contact with reagents.

The method of paragraph [0158], wherein the reagents are hydrocarbons.

The disclosure further provides a method for creating the composition of matter of paragraph [0126] comprising: preparing the composition of matter of paragraph [0120]; incubating the composition of matter of paragraph [0120] in a solution comprising a plant active and a solvent such that the plant active diffuses into the porous particles of the composition of matter of paragraph [0120]; and evaporating the solvent to yield the composition of matter of paragraph [0126].

The method of paragraph [0160], wherein the solvent is evaporated at ambient temperature or higher.

The disclosure further provides a method for delivering a plant active comprising: preparing the composition of matter of paragraph [0126]; combining the composition of matter of paragraph [0126] with a carrier; and spraying a plant with the combined composition of matter of paragraph [0126] and carrier.

The method of paragraph [0162], wherein the carrier is a liquid.

The disclosure further provides a method for creating the composition of matter of paragraph [0130] comprising: preparing the composition of matter of paragraph [0120]; incubating the composition of matter of paragraph [0120] in a solution comprising a pharmaceutical drug and a solvent such that the pharmaceutical drug diffuses into the porous particles of the composition of matter of paragraph [0120]; and evaporating the solvent to yield the composition of matter of paragraph [0130].

The method of paragraph [0164], wherein the solvent is evaporated at ambient temperature or higher.

The disclosure further provides a method for delivering a pharmaceutical drug comprising: preparing the composition of matter of paragraph [0130], combining the composition of matter of paragraph [0130] with a pharmaceutical carrier; and administering the composition of matter of paragraph [0130] and pharmaceutical carrier to a human or animal.

The disclosure further provides a method for creating the composition of matter of paragraph [0131] comprising inserting a ligand into the interior of the porous particles through the nanotubes.

The disclosure further provides a method of absorbing environmental contaminants comprising: preparing the composition of matter of paragraph [0132] by the method of paragraph [0167]; placing the composition of matter of paragraph [0132] in contact with the environmental contaminants.

The disclosure further provides a method for creating the composition of matter of paragraph [0133] comprising: sending polymers in a solvent into the interior of the porous particles through the nanotubes; and evaporating the solvent to yield polymers captured in the interior of the porous particles.

The method of paragraph [0169], wherein the polymers are sent into the interior of the porous particles through the nanotubes via diffusion.

The disclosure further provides a method of capturing carbon dioxide ($CO_2$) comprising: preparing the composition of matter of paragraph [0133] by the method of paragraph [0170]; placing the composition of matter of paragraph [0133] or [0134] in contact with carbon dioxide ($CO_2$).

The disclosure further provides a method of preparing the composition of matter of paragraph [0135] comprising combining a salt comprising calcium, a solvent, and nanotubes to make a precursor solution; aerosolizing the precursor solution into droplets; and heating the droplets to make particles.

The method of paragraph [0172], further comprising separating the particles from waste using a filter.

The method of paragraph [0172], wherein the salt comprising calcium is calcium hydroxide ($Ca(OH)_2$).

The method of paragraph [0172], wherein the nanotubes are ceramic.

The method of paragraph [0172], wherein the nanotubes are halloysite.

The method of paragraph [0172], wherein the solvent is ethanol/water (80/20 by volume).

The method of paragraph [0172], wherein the solution is heated between 200-600 degrees Celsius, inclusive.

The method of paragraph [0172], wherein the salt comprising calcium is calcium hydroxide ($Ca(OH)_2$), the solvent is ethanol/water (80/20), and the nanotubes are halloysite.

The disclosure further provides a method of converting calcium oxide (CaO) into calcium carbonate ($CO_3$) comprising: preparing the composition of matter of paragraph [0135]; and placing the composition of matter of paragraph [0135] in contact with carbon dioxide ($CO_2$).

What is claimed:

1. A composition of matter comprising:

a porous particle having an interior and a surface; and a ceramic or halloysite nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein (a) the lumen of the nanotube is substantially free of the porous particle; and/or (b) the composition of matter further comprises a plant active, a pharmaceutical drug, a ligand, a polymer, an aminated compound, or a combination thereof embedded in the porous particle.

2. The composition of matter of claim 1, wherein the composition of matter comprises (a) and (b).

3. The composition of matter of claim 1, wherein (b) further comprises a catalyst embedded in the porous particle, the catalyst comprising a zeolite, a noble metal, a transition metal cluster, a transition metal cluster ion exchanged into zeolite, or a combination thereof.

4. A method of synthesizing the composition of matter of claim 1, comprising:

aerosolizing into droplets a precursor solution comprising a templating surfactant, a silica precursor, a solvent, and nanotubes; and heating the droplets to make particles.

5. A method for preparing a composition of matter comprising:

incubating the composition of matter of claim 1 in a solution comprising the plant active or the pharmaceutical drug, and a solvent; and evaporating the solvent to yield the composition of matter.

6. A method for preparing a composition of matter comprising contacting the composition of matter of claim 1 with a ligand.

7. A method of absorbing on the composition of matter of claim 1 environmental contaminants comprising:

placing the composition of matter of claim 1 embedded with a ligand in contact with the environmental contaminants.

8. A method for preparing a composition of matter of claim 1 comprising:

incubating a composition of matter comprising a porous particle and a nanotube penetrating the porous particle in a solution comprising polymers and a solvent; and evaporating the solvent to yield polymers embedded in the interior of the porous particle.

9. A method of converting calcium oxide (CaO) into calcium carbonate (CaCO3) comprising contacting the composition of matter of claim 1 comprising calcium oxide with carbon dioxide (CO2).

10. A composition of matter comprising:

a porous particle having an interior and a surface; and a nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein the composition of matter further comprises a plant active embedded in the porous particle, wherein the plant active comprises a fertilizer, a nutrient, a pesticide, or a combination thereof.

11. A method for delivering a plant active to a plant comprising:

spraying the plant with a combination of the composition of matter of claim 10 and a carrier.

12. A composition of matter comprising:

a porous particle having an interior and a surface; and a nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein the composition of matter further comprises an aminated compound polymer embedded in the porous particle, wherein the polymer comprises poly(ethyleneimine)(PEI).

13. The composition of matter of claim 12, further comprising $CO_2$ adsorbed to the PEI.

14. A composition of matter comprising:

a porous particle having an interior and a surface; and a nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein (a) the lumen of the nanotube is substantially free of the porous particle; and/or (b) the composition of matter further comprises a plant active, a pharmaceutical drug, a ligand, a polymer, an aminated compound, or a combination thereof embedded in the porous particle; and wherein the composition of matter comprises an aminated compound, the aminated compound comprising monoethanolamide, triethanolamine, diethanolamine, diethylenetriamine, tetraethylenepentamine, tetraethylenepentamineacrylonitrile, 3-aminopropytriethyoxysilane, or a combination of the foregoing.

15. The composition of matter of claim 14, further comprising $CO_2$ adsorbed to the aminated compound.

16. A method of capturing carbon dioxide (CO2) in the composition of matter of claim 14 comprising:

contacting the composition of matter of claim 14 with carbon dioxide (CO2).

17. A composition of matter comprising:

a porous particle having an interior and a surface, wherein the porous particle is selected from the group comprising: MCM-41, MCM-48, MCM-50, SBA-11, SBA-12, SBA-15, SBA-16, KIT-5, and COK-12; and a nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein (a) the lumen of the nanotube is substantially free of the porous particle; and/or (b) the composition of matter further comprises a plant active, a pharmaceutical drug, a ligand, a polymer, an aminated compound, or a combination thereof embedded in the porous particle.

18. A composition of matter comprising:

a porous particle having an interior and a surface, the porous particle comprising calcium oxide (CaO) or silica; and a nanotube comprising an outer wall having two ends and an open lumen, the nanotube penetrating the porous particle such that one end of the nanotube is exposed to the interior of the porous particle and does not extend outside of the porous particle and the other end of the nanotube is exposed to an environment outside of the interior and surface of the porous particle, and the lumen of the nanotube is open to the environment, wherein (a) the lumen of the nanotube is substantially free of the porous particle; and/or (b) the composition of matter further comprises a plant active, a pharmaceutical drug, a ligand, a polymer, an aminated compound, or a combination thereof embedded in the porous particle.

19. A method of preparing the composition of matter of claim 18, comprising:

aerosolizing a precursor solution comprising a salt comprising calcium, a solvent, and nanotubes into droplets; and heating the droplets to make particles.

20. A method of synthesizing the composition of matter of claim 14, comprising:

aerosolizing into droplets a precursor solution comprising a templating surfactant, a silica precursor, a solvent, and nanotubes; and heating the droplets to make particles.

21. A method of synthesizing the composition of matter of claim 17, comprising:

aerosolizing into droplets a precursor solution comprising a templating surfactant, a silica precursor, a solvent, and nanotubes; and heating the droplets to make particles.

22. A method of synthesizing the composition of matter of claim 18, comprising:

aerosolizing into droplets a precursor solution comprising a templating surfactant, a silica precursor, a solvent, and nanotubes; and heating the droplets to make particles.

* * * * *